(12) United States Patent
Zettsu et al.

(10) Patent No.: US 6,980,205 B1
(45) Date of Patent: Dec. 27, 2005

(54) METHOD AND APPARATUS FOR FIXING DISPLAY INFORMATION

(75) Inventors: Koji Zettsu, Fujisawa (JP); Kazuhiro Minami, West Lebanon, NH (US); Hajime Tsuchitani, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 09/625,298

(22) Filed: Jul. 25, 2000

(30) Foreign Application Priority Data

Aug. 17, 1999 (JP) .................................. 11-230537

(51) Int. Cl.[7] ............................................. G06F 17/00
(52) U.S. Cl. ..................................... 345/418; 345/520
(58) Field of Search ................ 345/733, 762, 345/520, 418; 707/512, 513

(56) References Cited

U.S. PATENT DOCUMENTS

| | | | | |
|---|---|---|---|---|
| 5,734,915 A | * | 3/1998 | Roewer ........................ | 707/512 |
| 5,960,406 A | * | 9/1999 | Rasansky et al. .............. | 705/9 |
| 6,012,071 A | * | 1/2000 | Krishna et al. ............... | 715/522 |
| 6,338,081 B1 | * | 1/2002 | Furusawa et al. ............. | 709/202 |
| 6,772,109 B2 | * | 8/2004 | Tsuchitani et al. ............ | 704/2 |
| 2002/0055846 A1 | * | 5/2002 | Tsuchitani et al. ........... | 704/275 |

FOREIGN PATENT DOCUMENTS

| | | | | | |
|---|---|---|---|---|---|
| DE | 10033866 A1 | * | 3/2001 | ............. | G06F 3/00 |
| GB | 2327516 A | * | 1/1999 | ............. | G06F 9/46 |
| GB | 2338575 A | * | 12/1999 | ............. | G06F 9/46 |
| JP | 269999 | | 10/1997 | ............. | G06T 1/00 |
| JP | 105514 | | 4/1998 | ........... | G06F 15/00 |
| JP | 198596 | | 7/1998 | ........... | G06F 12/00 |
| JP | 312344 | | 11/1998 | ........... | G06F 13/00 |
| JP | 326169 | | 12/1998 | ............. | G06F 3/14 |
| JP | 175425 | | 7/1999 | ........... | G06F 13/00 |
| JP | 203226 | | 7/1999 | ........... | G06F 13/00 |

* cited by examiner

*Primary Examiner*—Michael Razavi
*Assistant Examiner*—Javid A Amini
(74) *Attorney, Agent, or Firm*—Duke W. Yee; A. Bruce Clay; Lisa L. B. Yociss

(57) ABSTRACT

A page template, which serves as the prototype of a web page, contains formatter specifying information and display attribute information. The formatter specifying information is information for specifying one formatter out of a plurality of types (banner, Telop, a plurality of banner arrangements or the like). Display attribute information is information for controlling the moves of the formatter. When a page template is called by a web browser, the formatter is actuated, and selects, arranges, or controls the display sequence, display time or the like of, contents to be embedded into the template in accordance with display attributes, or effects such controls as the reduction of a display area (an area in the template available for embedding contents) to the size of contents.

14 Claims, 39 Drawing Sheets

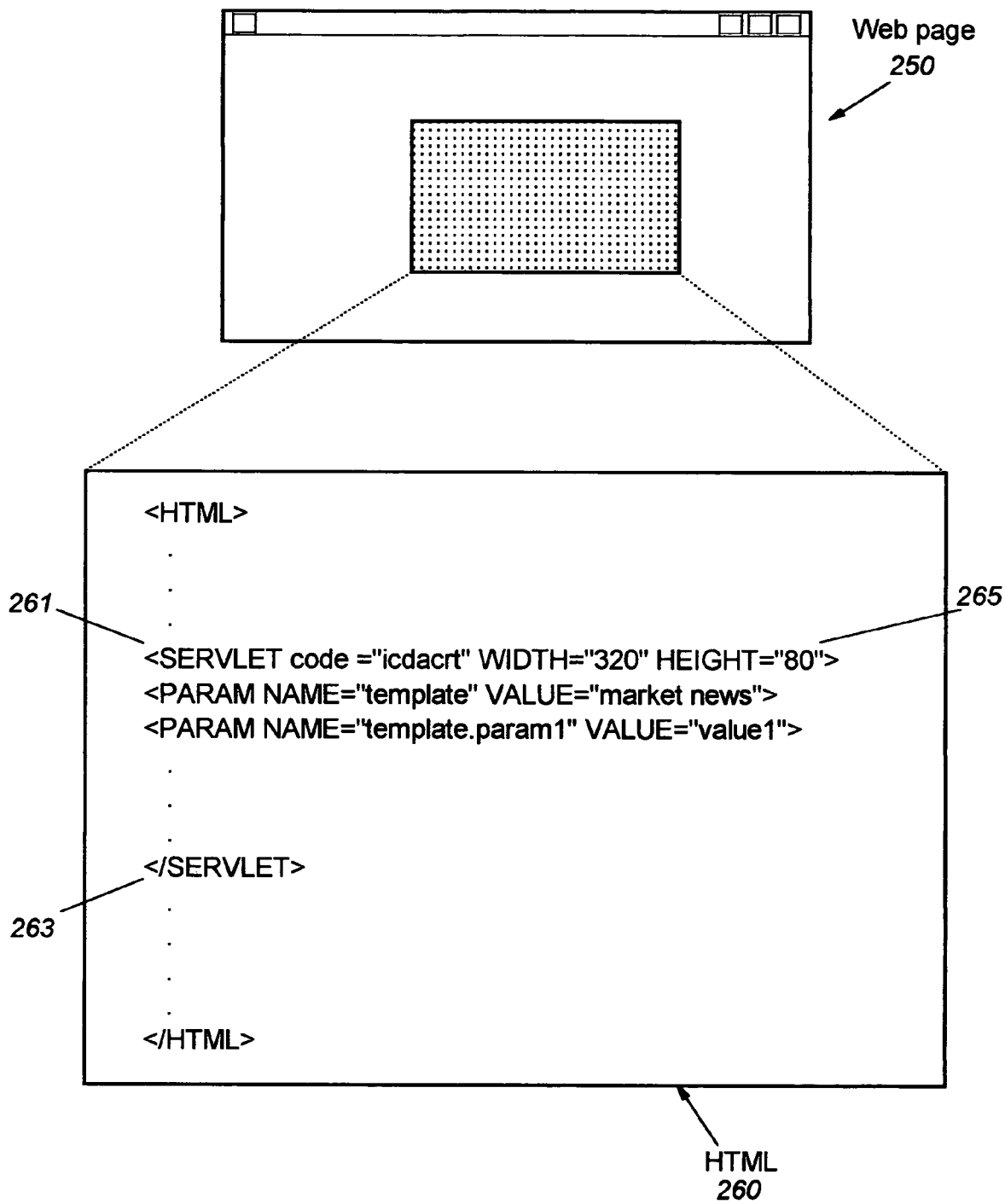

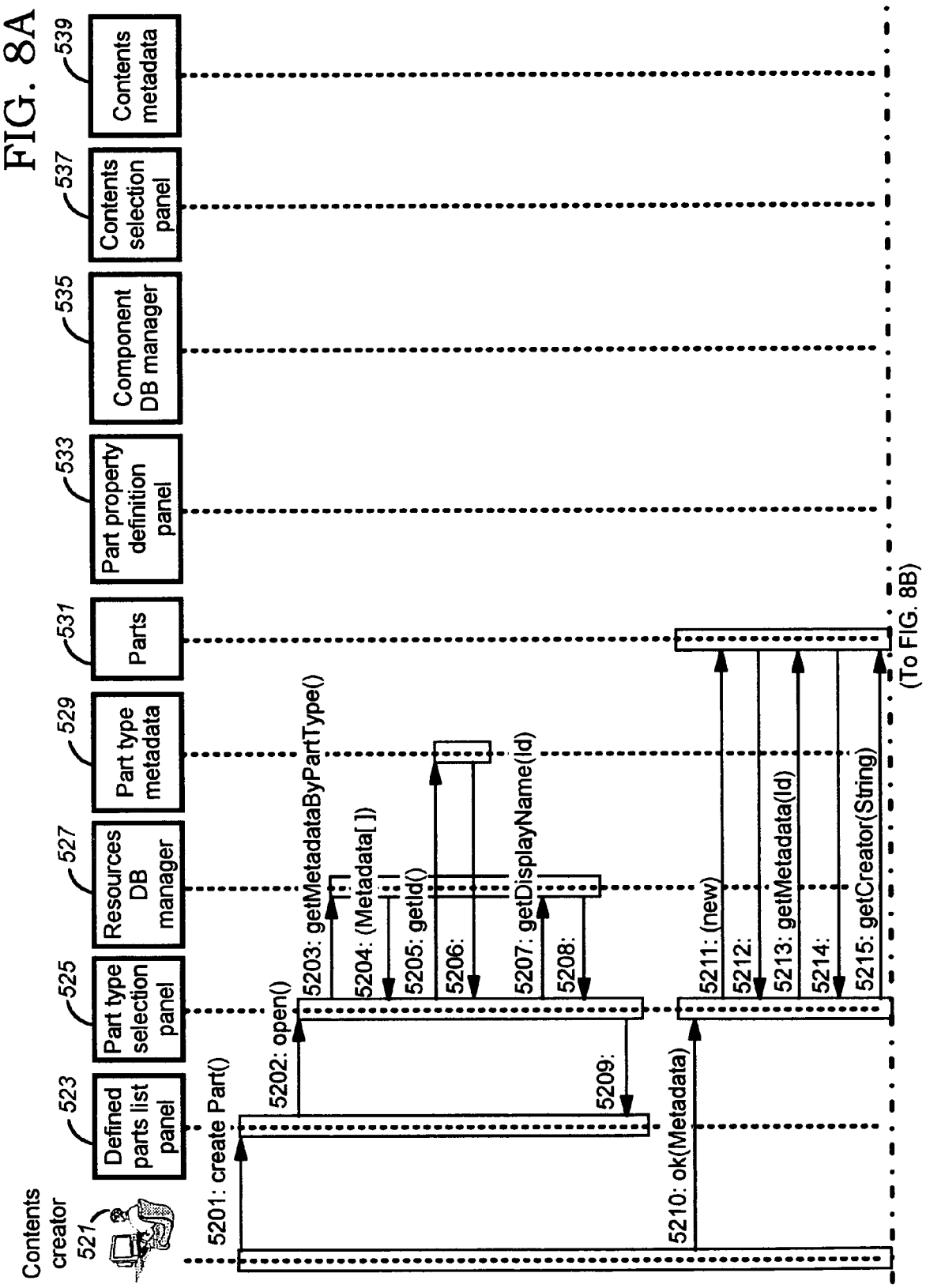

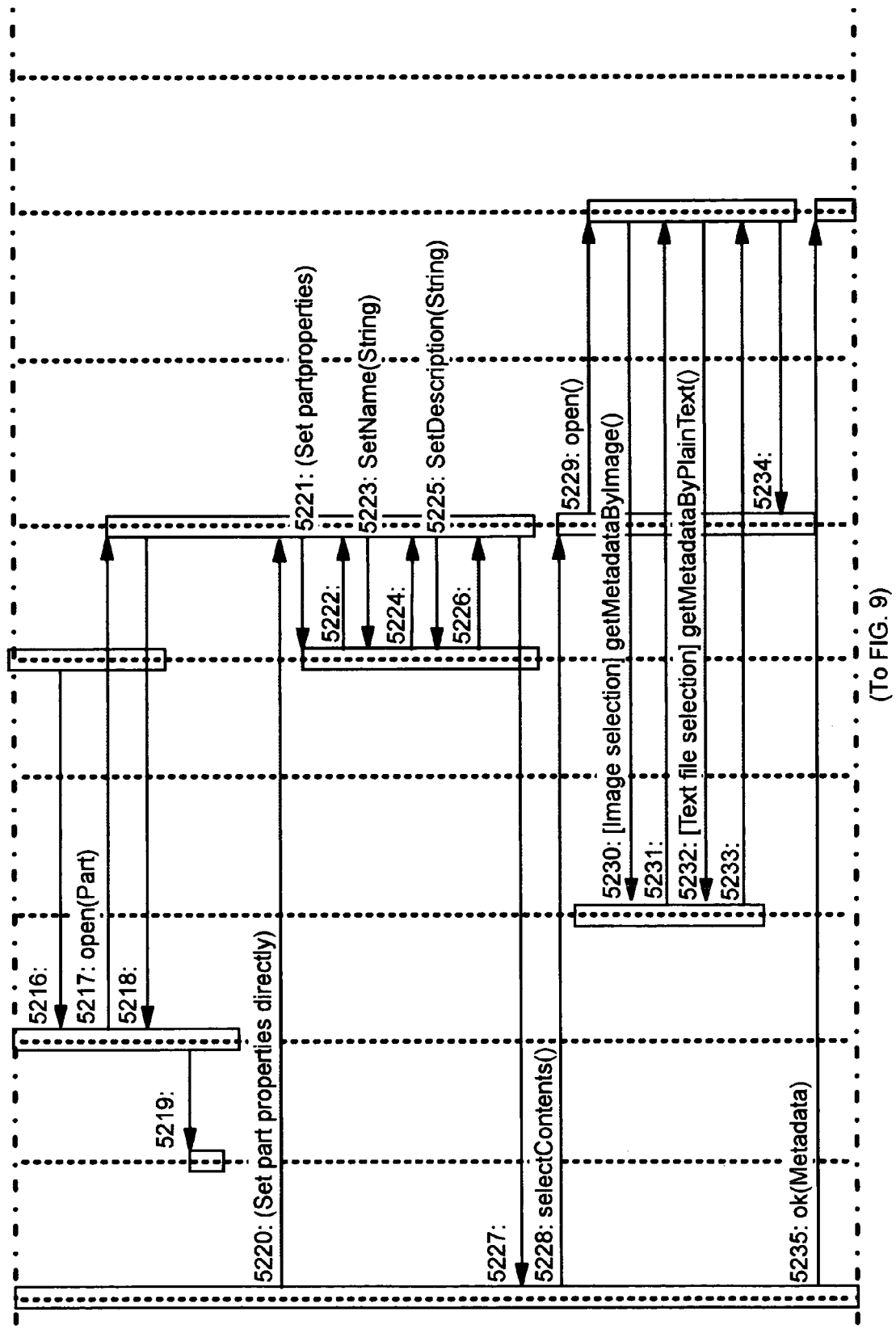

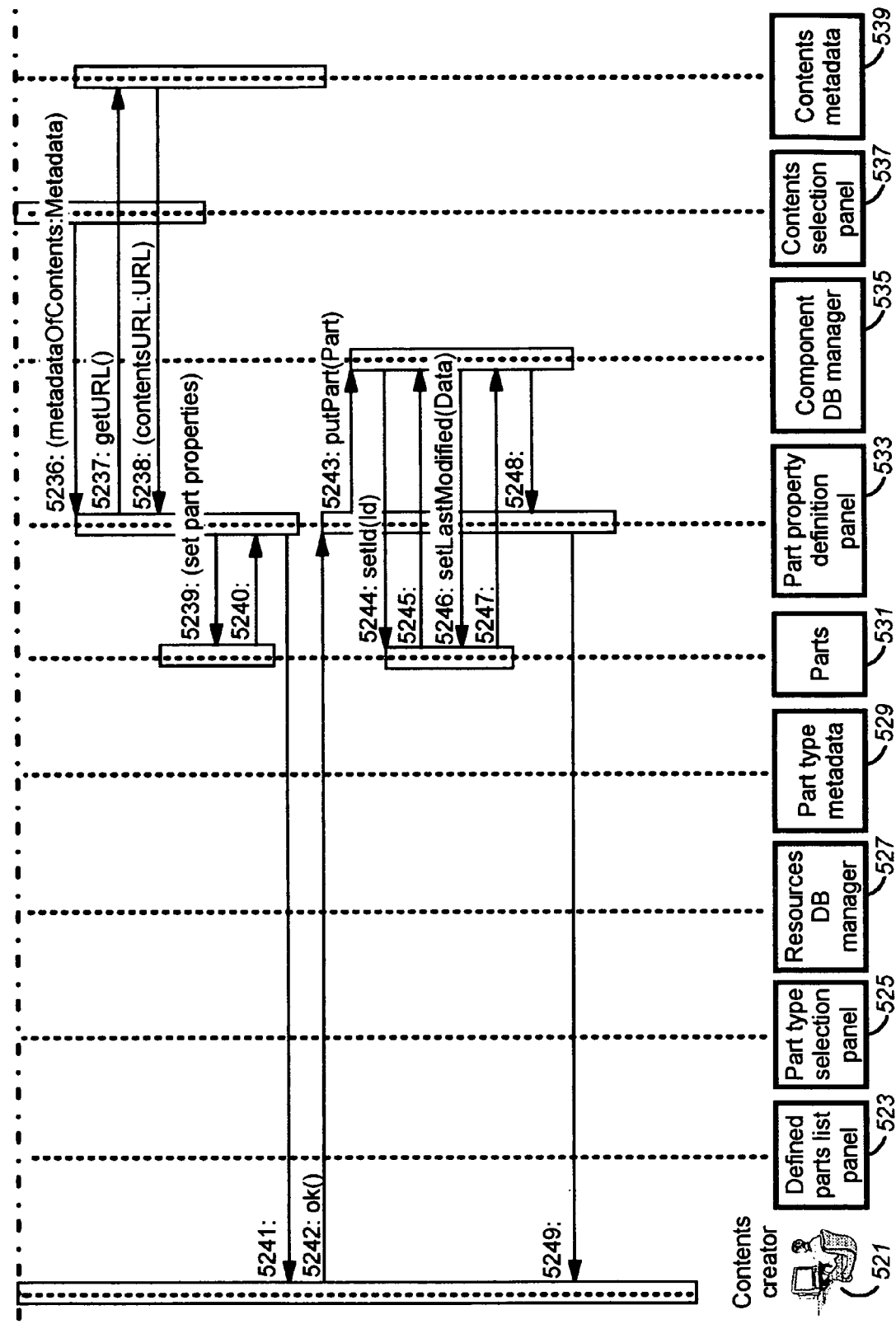

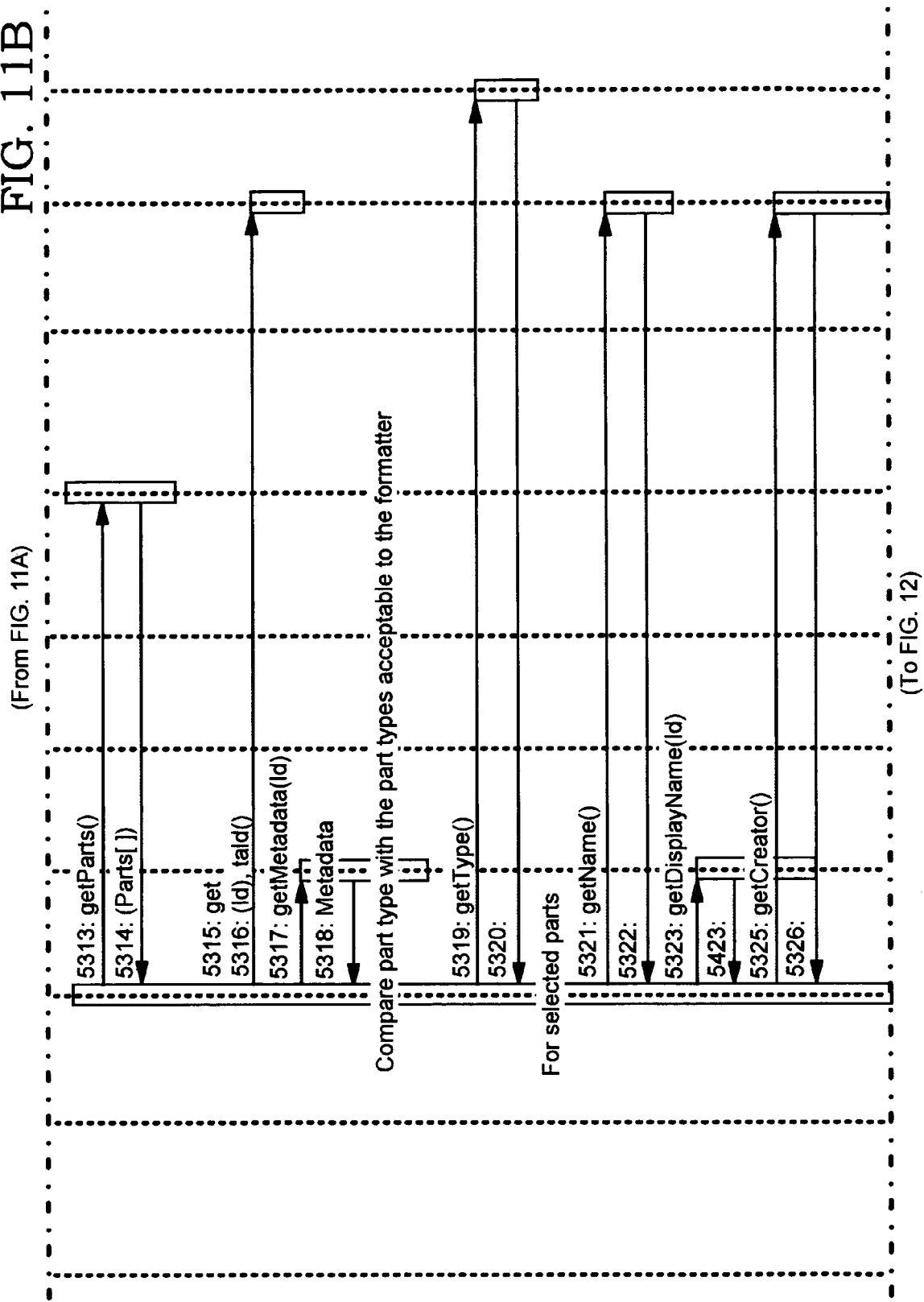

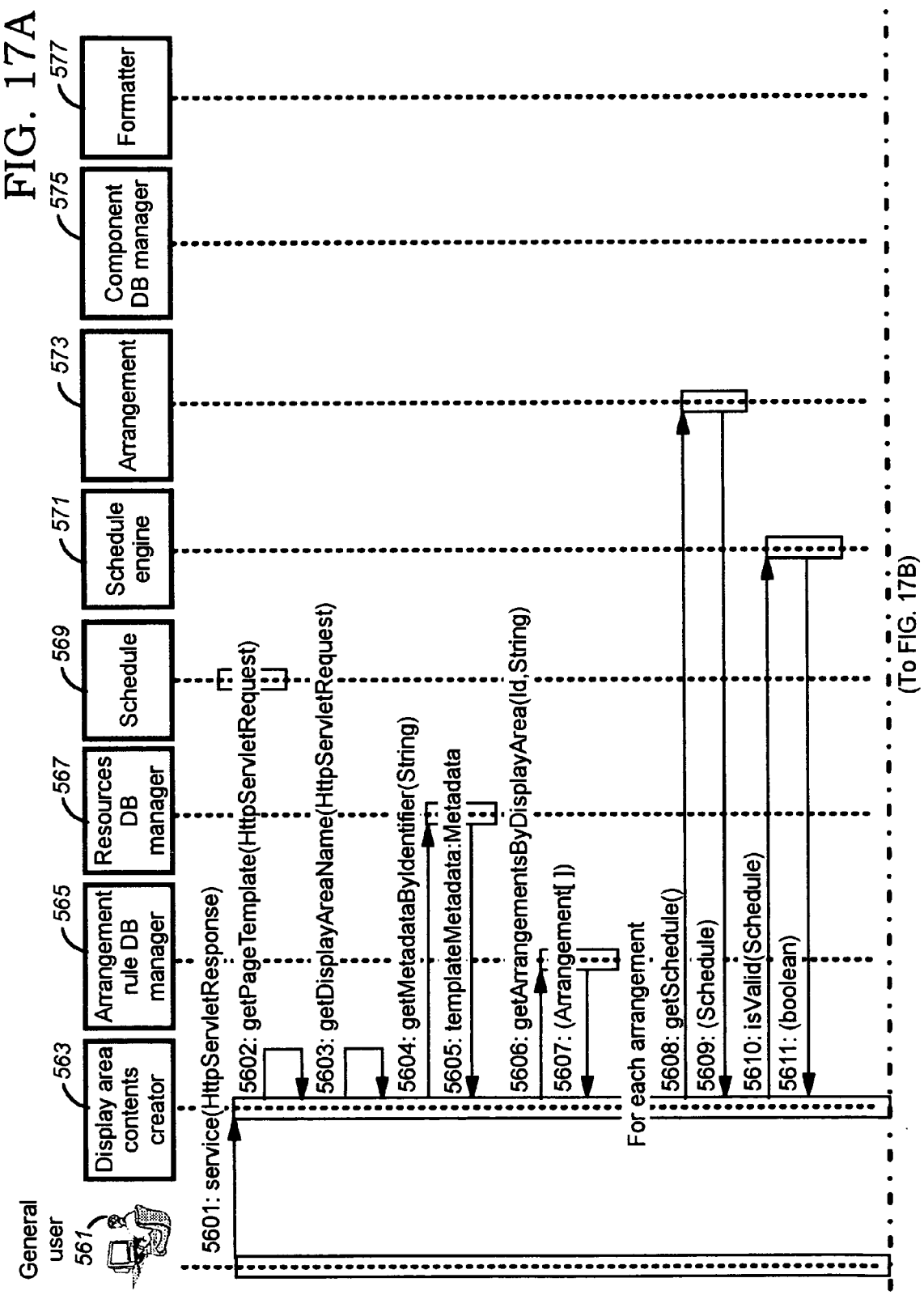

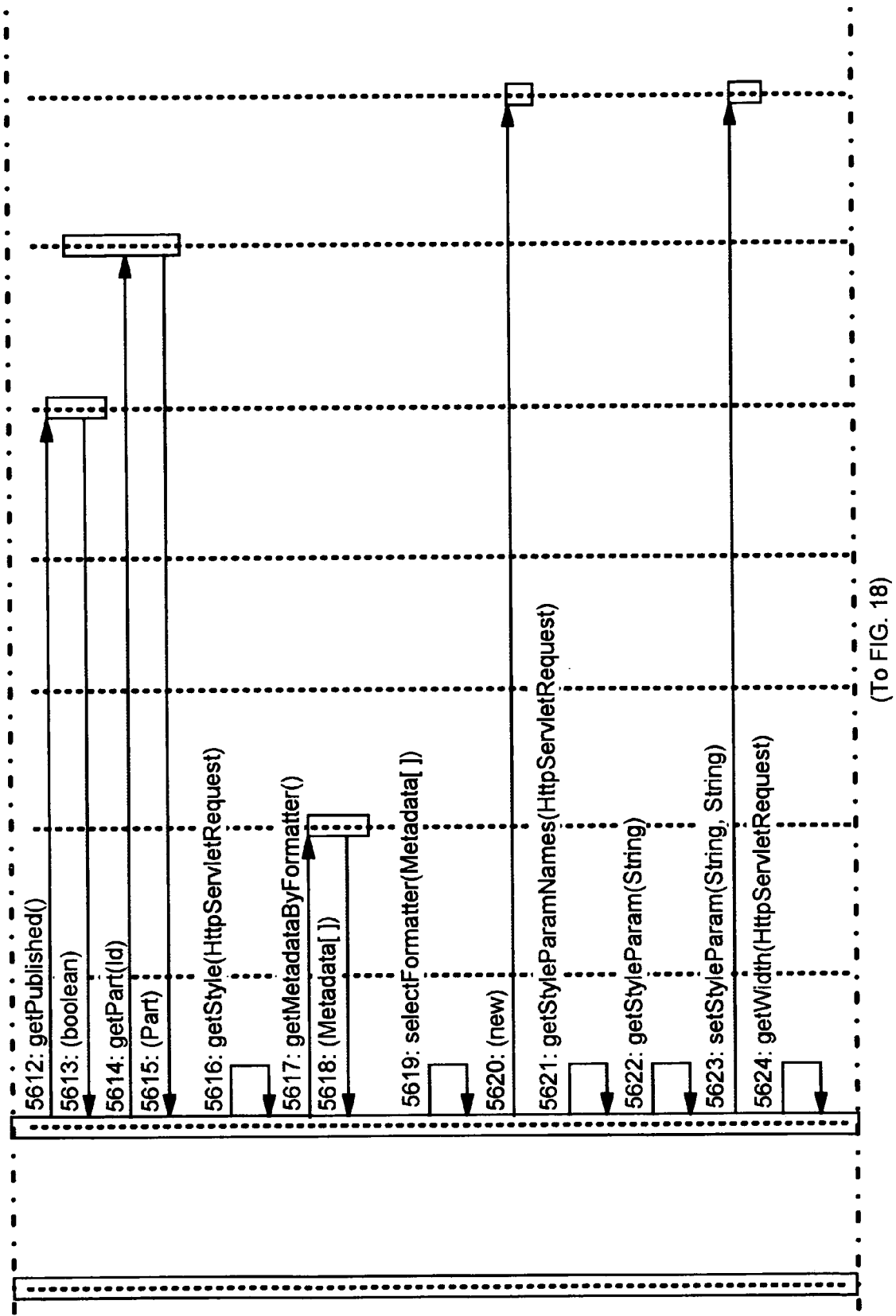

FIG. 19

```
<SERVLET code=icdacrt codebase=servlet>                                    701
    <PARAM NAME="name" VALUE="product_ad">
    <PARAM NAME="style" VALUE="bannerFlow">
    <PARAM NAME="direction" VALUE="horizontal">
    <PARAM NAME="bgColor" VALUE="Gray"
    <PARAM NAME="width" VALUE="300">
    <PARAM NAME="height" VALUE="80">                                       703
    <PARAM NAME="position" VALUE="top">
    <PARAM NAME="default" VALUE="<IMG SRC='default_img.gif'>">
    <PARAM NAME="partsOverfull" VALUE="random">
    <PARAM NAME="partsUnderfull" VALUE="shrink">
</SERVLET>
```

Example of mounted display area 700

FIG. 20

| Part ID | Part display area name | Part template ID | START | END | Publish |
|---|---|---|---|---|---|
| 0001 | product_ad | 1001 | 1999-01-01 0:00 | 1999-07-01 0:00 | 1 |
| 0002 | product_ad | 1002 | 1999-07-01 0:00 | 2000-01-01 0:00 | 1 |
| 0003 | product_inf | 1003 | 1999-08-01 4:00 | 1999-09-20 23:00 | 0 |
| . | . | . | . | . | . |
| . | . | . | . | . | . |
| . | . | . | . | . | . |

Arrangement rule DB 720

FIG. 24

Difference in format with display are style

```
<SERVLET code=indacrt codebase=/servlet>
    <PARAM NAME="name" VALUE="product_ad">
    <PARAM NAME="style" VALUE="banner">
    <PARAM NAME="width" VALUE="100">
    <PARAM NAME="height" VALUE="40">
    <PARAM NAME="position" VALUE="top">
    <PARAM NAME="default" VALUE="<IMG SRC='default_img.gif'>">
    <PARAM NAME="partsOverfull" VALUE="rotation=2">
    <PARAM NAME="partUnderfull" VALUE="shrink">
</SERVLET>
```

FIG. 25

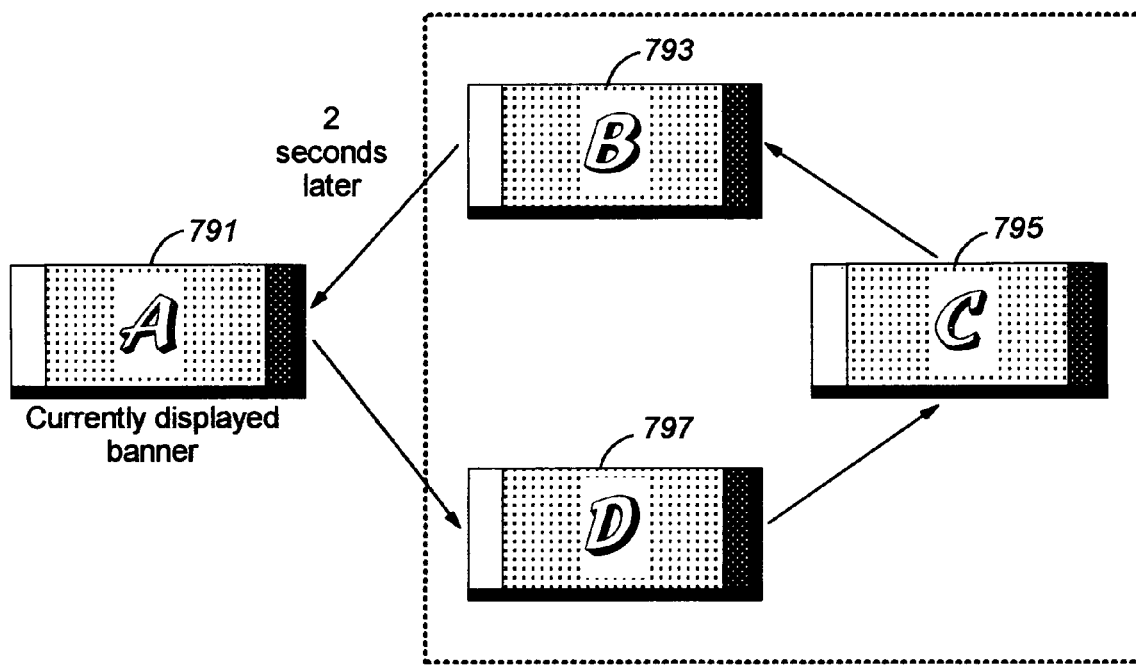

FIG. 28

```
<SERVLET code=indacrt codebase=/servlet>
    <PARAM NAME="name" VALUE="product_ad">
    <PARAM NAME="style" VALUE="bannerFlow">
    <PARAM NAME="direction" VALUE="horizontal">
    <PARAM NAME="bgColor" VALUE="gray">
    <PARAM NAME="width" VALUE="300">
    <PARAM NAME="height" VALUE="80">
    <PARAM NAME="position" VALUE="top">
    <PARAM NAME="default" VALUE="<IMG SRC='default_img.gif'>">
    <PARAM NAME="partsOverfull" VALUE="random">
    <PARAM NAME="partUnderfull" VALUE="shrink">
</SERVLET>
```

FIG. 29

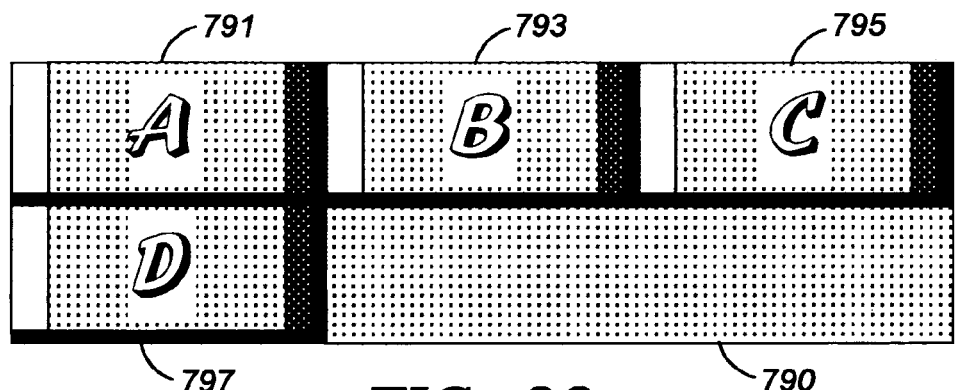

FIG. 30

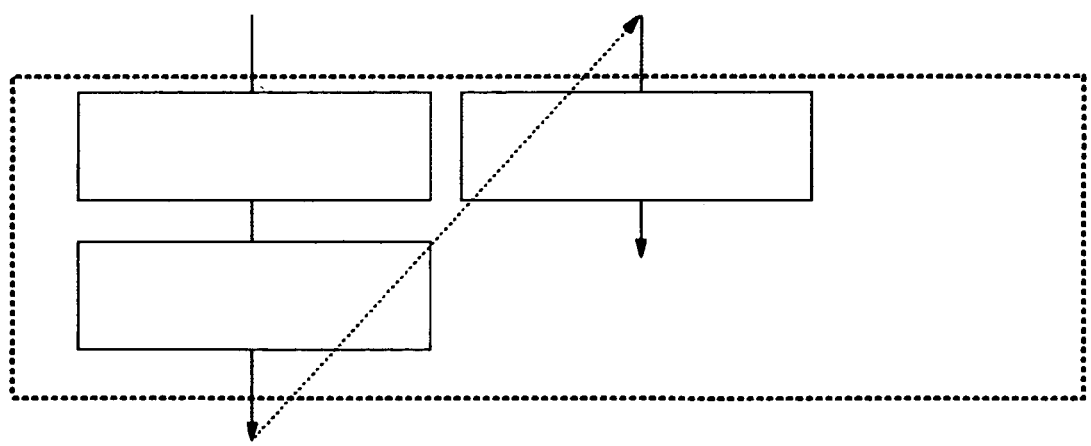

FIG. 33
Create array of parts to display all parts
parts[0...4]
direction == horizontal
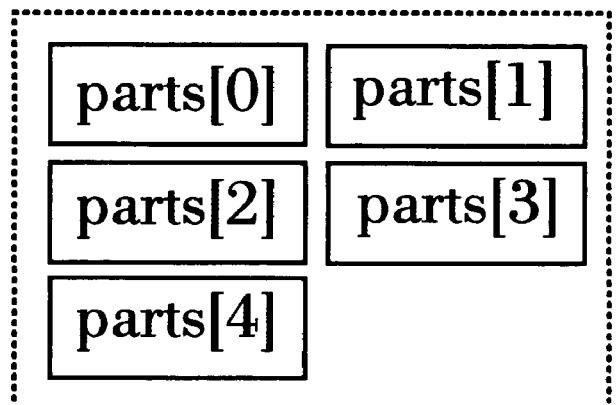
Parts arrangement
(0,0) = parts[0]; (0,1) = parts[1];
(1,0) = parts[2]; (1,1) = parts[3];
(2,0) = parts[4];
direction == vertical
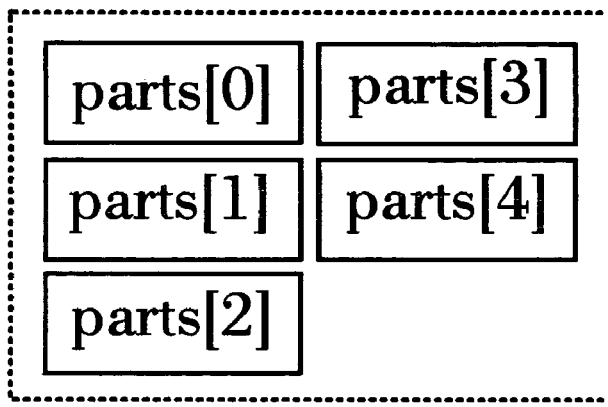
Parts arrangement
(0,0) = parts[0]; (0,1) = parts[3];
(1,0) = parts[1]; (1,1) = parts[4];
(2,0) = parts[2];

FIG. 34

Select parts in succession and create array of parts
parts[0...4]

Case of direction == horizontal

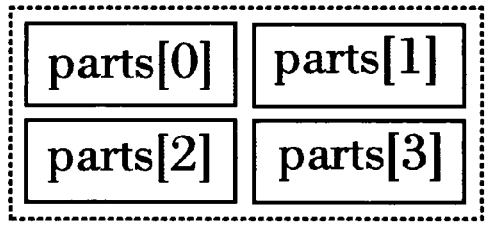

Parts arrangement
(0,0) = parts[0]; (0,1) = parts[1];
(1,0) = parts[2]; (1,1) = parts[3];

⇓ After designated length of time

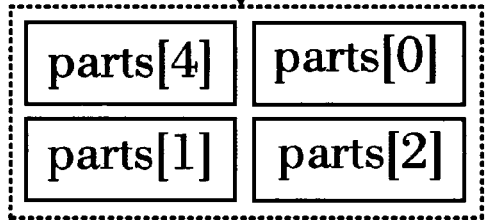

Parts arrangement
(0,0) = parts[4]; (0,1) = parts[0];
(1,0) = parts[1]; (1,1) = parts[2];

FIG. 35

Select parts at random and create array of parts
parts[0...4]
Select at random in sequence of parts[4], parts[2], parts[0], parts[3] and [arts[1]

Case of direction = horizontal

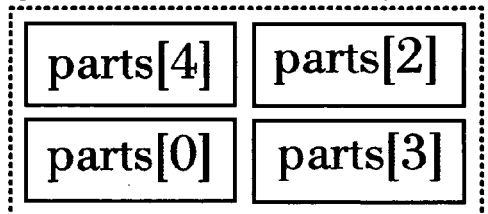

Parts arrangement
(0,0) = parts[4]; (0,1) = parts[2];
(1,0) = parts[0]; (1,1) = parts[3];

FIG. 38

| Part type | Part ID | Part display area name | Page template ID | START | END | Publish | Event flag | Cell part ID |
|---|---|---|---|---|---|---|---|---|
| Banner | 0001 | product_ad | 1001 | 1999-01-01 0:00 | 1999-07-01 0:00 | 1 | 1 | 2001 |
| Banner | 0002 | product_ad | 1002 | 1999-07-01 0:00 | 2000-01-01 0:00 | 1 | 1 | 2001 |
| Telop | 0003 | product_inf | 1003 | 1999-08-01 4:00 | 1999-09-20 23:00 | 0 | 0 | 2001 |
| Event | 0004 | | | | | | 1 | 2003 |
| . | . | . | . | . | . | . | . | . |
| . | . | . | . | . | . | . | . | . |
| . | . | . | . | . | . | . | . | . |

720
Arrangement rule DB

FIG. 40

| User ID | Cookie | E-mail address | User profile |
|---|---|---|---|
| | | | |
| | | | |
| | | | |

720
User management DB

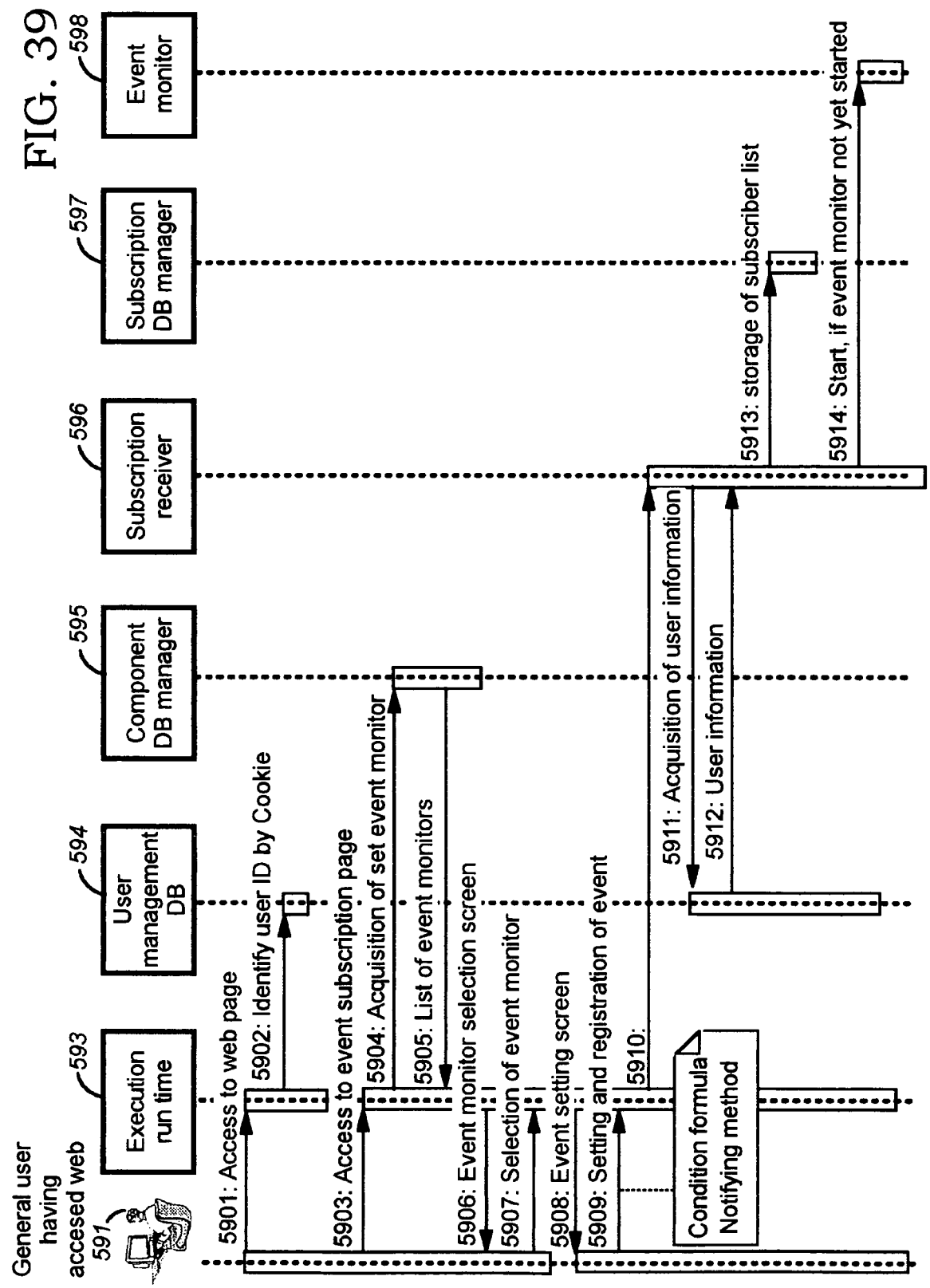

FIG. 41

| Subscription ID /751 | User ID /753 | Part ID /755 | Condition formula /757 | Notification form /758 | Campaign flag /759 |
|---|---|---|---|---|---|
| | | | | | |

750
Subscription DB

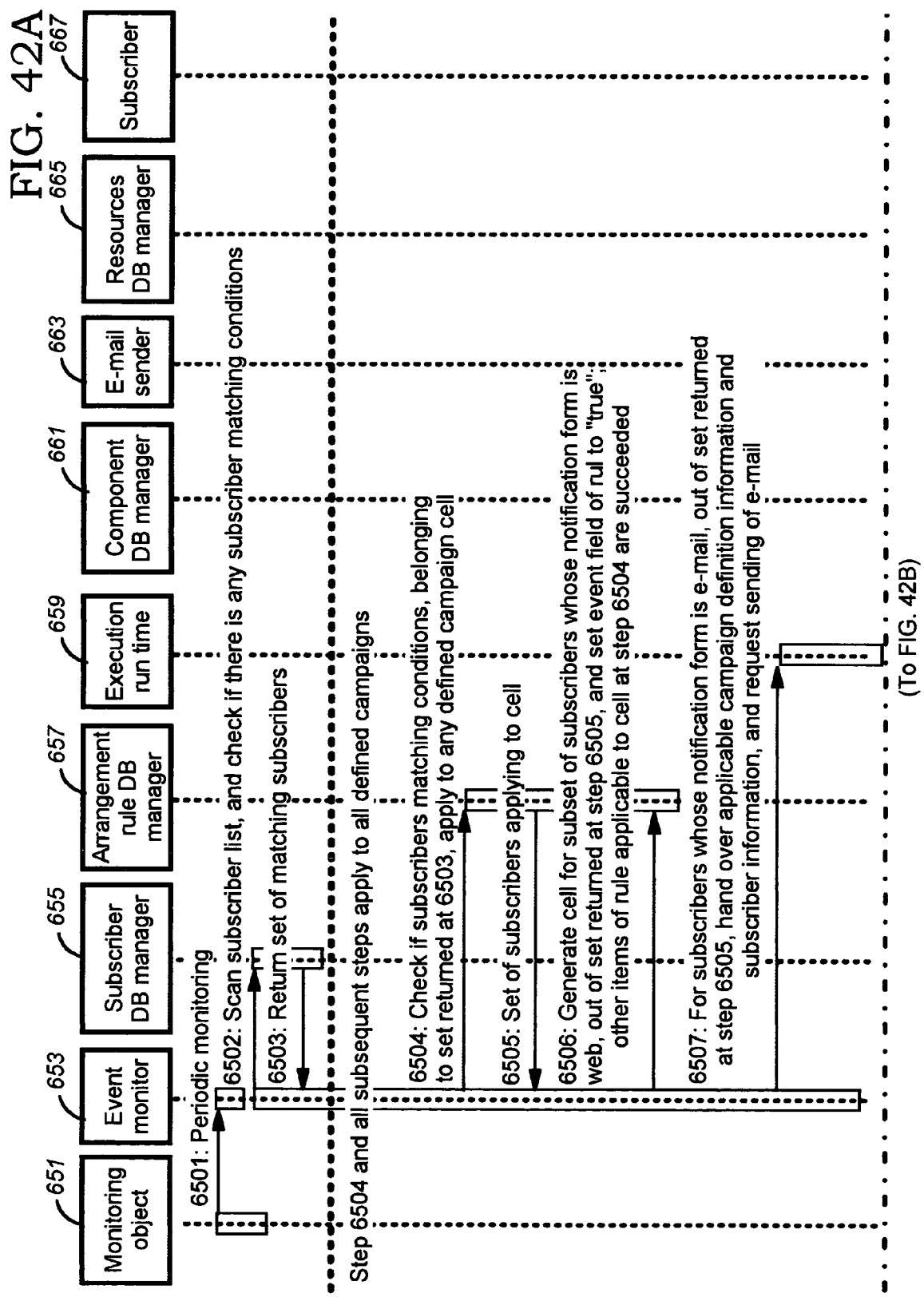

METHOD AND APPARATUS FOR FIXING DISPLAY INFORMATION

FIELD OF THE INVENTION

The present invention relates to a system for dynamically controlling the form of information displayed on a web browser, and in more detail relates to a system for dynamically controlling the form of data to be embedded into a page template.

BACKGROUND OF THE INVENTION

Known techniques can choose information that is less likely to be changed in an HTML template and embed information more likely to be changed into this template for displaying as disclosed in the Published Unexamined Patent Application Nos. 10-198596, 11-85727, 10-334086 and 11-66152.

However, such techniques have adopted a system, as illustrated in FIG. 43, of selecting data to be embedded into the template, to designate the accessing method, to designate the layout, to designate the data format, and the like, under a CGI program. An alternative system, as shown in FIG. 44, embeds a program (such as JavaBeans), to accesses prescribed data, displays them in a prescribed form, and incorporates them data into the template.

Such a CGI program (or JavaBean), in which database names, file names, and the like are described in a fixed manner, required the occurrence of a workload to modify the CGI program or to replace the JavaBeans with new ones when it was desired to incorporate information from another database, or of another file, into the template without altering the database or the contents of the file themselves. This makes it impossible to dynamically switch prescribed displayed data. Additionally, the designer of a web page may be required to have knowledge of programming.

Especially when staging a campaign for various products with a web browser on the Internet. A campaign planner wants to be able to alter the contents or the layout according to the targeted customers' interest or to schedule without having to edit the HTML file or to modify the server program (such as CGI).

Furthermore, displaying contents strictly for a prescribed user, makes it possible to enhance advertising by communicating effective information, such as advertisements, that are based on the needs of that particular user, as well as to increase sales in electronic commerce.

SUMMARY OF THE INVENTION

An object of the present invention is to provide a system permitting alteration of the contents or layout to be embedded into a page template without having to edit the HTML file or modify the server program such as CGI.

Another object of the invention is to provide a system permitting dynamic alteration of the contents or layout to be embedded into a page template according to the situation at the time of accessing by a user.

Another object of the invention is to provide a versatile and low cost system permitting information on contents and layout to be embedded into a page template to be diverted to another page template.

Another object of the invention is to provide a system permitting, on the basis of the behavior of a user having used Internet, information fitting that particular user's taste and behavioral pattern to be supplied only to the user or a group including that user.

Another object of the invention is to provide a system reduced in resources required at the time of execution.

According to one aspect of the present invention, a page template which would serve as the prototype of a web page contains formatter specifying information and display attribute information. This formatter specifying information is information to specify one out of a plurality of kinds of formatters (banner, Telop, a plurality of banners arrangement, and the like). Display attribute information is information for controlling the moves of this formatter. When a page template is called by a web browser, this formatter is actuated and effects such controls as selecting, arranging, and determining the displaying sequence and time of the contents to be embedded into the template according to the display attributes, or reducing the display area (the area made available in the template for embedding the contents) to the size of the contents.

According to another aspect of the invention, there is provided a display information fixing method to be executed on a display information fixing apparatus for transmitting page information to an information terminal having a display screen and an input unit, comprising the steps of:
 (a) analyzing a page template specified by a display information acquisition request from the information terminal,
 (b) acquiring formatter specifying information and display attribute information from the page template,
 (c) acquiring a formatter on the basis of the formatter specifying information, and
 (d) processing contents to be incorporated into the page template on the basis of the display attribute, and generating page information to be displayed on the display apparatus of the information terminal.

In the claims of the specification under the present application, "formatter specifying information" is a concept covering information used for specifying a formatter, such as the path name, file name, database name, table name, and information to identify the type of formatter. "Contents" is a concept referring to parts registered correspondingly to display areas in an arrangement rule DB to be explained with reference to an embodiment to be described below, covering not only contents registered in parts whose display conditions have prescribed values but also contents specified by descriptions fixed by a path name and the like in display areas. And "processing" is a concept covering alteration of any content in size, shape, arrangement, background color, color of its own, and display method (such as being displayed while moving from right to left, or emerging in a grid form).

According to another aspect of the invention, there is provided a display information fixing method to be executed on a display information fixing apparatus for transmitting display information to an information terminal having a display screen and an input unit, comprising to steps of:
 (a) analyzing a page template specified by a display information acquisition request from the information terminal,
 (b) acquiring formatter specifying information and display attribute information from the page template,
 (c) acquiring a formatter on the basis of the formatter specifying information,
 (d) acquiring information on a plurality of contents to be displayed on the page template, and (e) generating, if it is judged that the display attributes include one indicating rotation, page information including information on a first content among the plurality of contents and generating, after the lapse of a prescribed length of time, page information including information on a second content among the plurality of contents.

According to another aspect of the invention, there is provided a display information fixing method to be executed on a display information fixing apparatus for transmitting display information to an information terminal having a display screen and an input unit, comprising the steps of:
(a) analyzing a page template specified by a display information acquisition request from the information terminal,
(b) acquiring formatter specifying information and display attribute information from the page template,
(c) acquiring a formatter on the basis of the formatter specifying information,
(d) acquiring information on a plurality of contents to be displayed on the page template, and
(e) excluding, if it is judged that the display attributes include one indicating random, information on a first content among the plurality of contents and generating page information including information on a second content among the plurality of contents.

According to another aspect of the invention, there is provided a display information fixing method to be executed on a display information fixing apparatus for transmitting display information to an information terminal having a display screen and an input unit, comprising the steps of:
(a) analyzing a page template specified by a display information acquisition request from the information terminal,
(b) acquiring formatter specifying information and display attribute information from the page template,
(c) acquiring a formatter on the basis of the formatter specifying information,
(d) acquiring information on any content to be displayed on the page template,
(e) acquiring size information on a display area predefined to display the content from the page template,
(f) comparing the size information on the display area with the size information on the acquired content, and
(g) adjusting, if it is judged that the size information on the display area has a greater value than the size information on the acquired content and the display attributes include one to instruct adjusted displaying, the size of the display area to the size of the content and generating page information.

According to another aspect of the invention, there is provided a display information fixing method to be executed on a display information fixing apparatus for transmitting display information to an information terminal having a display screen and an input unit, comprising the steps of:
(a) analyzing a page template specified by a display information acquisition request from the information terminal,
(b) acquiring formatter specifying information and display attribute information from the page template,
(c) acquiring a formatter on the basis of the formatter specifying information,
(d) searching for information on a content to be displayed on the page template,
(e) judging, if it is judged that there is no content to be displayed, whether or not information on default contents is defined in the page template, and
(f) generating, if any information on default contents exists, page information including the information on default contents.

According to another aspect of the invention, there is provided a display information fixing method to be executed on a display information fixing apparatus for transmitting display information to an information terminal having a display screen and an input unit, comprising the steps of:
(a) analyzing a page template specified by a display information acquisition request from the information terminal,
(b) acquiring from the page template formatter specifying information and display attribute information on a formatter to control the arrangement of a plurality of contents,
(c) acquiring a formatter on the basis of the formatter specifying information,
(d) searching for information on a plurality of contents to be displayed on the page template, and
(e) generating page information on the arrangement of the contents on the basis of information indicating the direction of arrangement contained in the display attributes.

According to another aspect of the invention, there is provided a display information fixing apparatus for transmitting page information to an information terminal having a display screen and an input unit, comprising:
(a) an apparatus for analyzing a page template specified by a display information acquisition request from the information terminal,
(b) an apparatus for acquiring from the page template formatter specifying information and display attribute information,
(c) an apparatus for acquiring a formatter on the basis of the formatter specifying information, and
(d) an apparatus for processing, on the basis of the display attributes, contents to be incorporated into the page template and generating page information to be displayed on the display unit of the information terminal.

According to another aspect of the invention, there is provided a display information fixing apparatus for transmitting page information to an information terminal having a display screen and an input unit, comprising:
(a) an apparatus for analyzing a page template specified by a display information acquisition request from the information terminal,
(b) an apparatus for acquiring formatter specifying information from the page template,
(c) an apparatus for acquiring a formatter on the basis of the formatter specifying information, and
(d) an apparatus for transmitting a formatter, together with the page template, to the information terminal to process, on the basis of the display attributes, contents to be incorporated into the page template and generating page information to be displayed on the display unit of the information terminal.

According to another aspect of the invention, there is provided a storage medium storing thereon a display information fixing program to be executed on a display information fixing apparatus for transmitting page information to an information terminal having a display screen and an input unit, the program comprising:
(a) a program code for instructing analysis of a page template specified by a display information acquisition request from the information terminal, (b) a program code for instructing acquisition of formatter specifying information and display attribute information from the page template,
(c) a program code for instructing acquisition of a formatter on the basis of the formatter specifying information, and
(d) a program code for instructing processing of contents to be incorporated into the page template on the basis of the display attributes and generation of page information to be displayed on the display apparatus of the information terminal.

According to another aspect of the invention, there is provided a storage medium storing thereon a display information fixing program to be executed on a display information fixing apparatus for transmitting display information to an information terminal having a display screen and an input unit, the program comprising:

(a) a program code for instructing analysis of a page template specified by a display information acquisition request from the information terminal,
(b) a program code for instructing acquisition of formatter specifying information and display attribute information from the page template,
(c) a program code for instructing acquisition of a formatter on the basis of the formatter specifying information,
(d) a program code for instructing acquisition of information on a plurality of contents to be displayed on the page template, and
(e) a program code for instructing, if it is judged that the display attributes include one indicating rotation, generation of page information including information on a first content among the plurality of contents and, after the lapse of a prescribed length of time, generation of page information including information on a second content among the plurality of contents.

According to another aspect of the invention, there is provided a storage medium storing thereon a display information fixing program to be executed on a display information fixing apparatus for transmitting display information to an information terminal having a display screen and an input unit, the program comprising:

(a) a program code for instructing analysis of a page template specified by a display information acquisition request from the information terminal,
(b) a program code for instructing acquisition of formatter specifying information and display attribute information from the page template,
(c) a program code for instructing acquisition of a formatter on the basis of the formatter specifying information,
(d) a program code for instructing acquisition of information on a plurality of contents to be displayed on the page template, and
(e) a program code for instructing exclusion, if it is judged that the display attributes include one indicating random, of information on a first content among the plurality of contents and generation of page information including information on a second content among the plurality of contents.

According to another aspect of the invention, there is provided a storage medium storing thereon a display information fixing program to be executed on a display information fixing apparatus for transmitting display information to an information terminal having a display screen and an input unit, the program comprising:

(a) a program code for instructing analysis of a page template specified by a display information acquisition request from the information terminal,
(b) a program code for instructing acquisition of formatter specifying information and display attribute information from the page template,
(c) a program code for instructing acquisition of a formatter on the basis of the formatter specifying information,
(d) a program code for instructing acquisition of information on any content to be displayed on the page template,
(e) a program code for instructing acquisition of size information on a display area predefined to display the content from the page template,
(f) a program code for instructing comparison of the size information on the display area with the size information on the acquired content, and
(g) a program code for instructing, if it is judged that the size information on the display area has a greater value than the size information on the acquired content and the display attributes include one to instruct adjusted displaying, adjustment of the size of the display area to the size of the content and for generating page information.

According to another aspect of the invention, there is provided a storage medium storing thereon a display information fixing program to be executed on a display information fixing apparatus for transmitting display information to an information terminal having a display screen and an input unit, the program comprising:

(a) a program code for instructing analysis of a page template specified by a display information acquisition request from the information terminal,
(b) a program code for instructing acquisition of formatter specifying information and display attribute information from the page template,
(c) a program code for instructing acquisition of a formatter on the basis of the formatter specifying information,
(d) a program code for instructing searching for information on a content to be displayed on the page template,
(e) a program code for instructing, if it is judged that there is no content to be displayed, judgment of whether or not information on default contents is defined in the page template, and
(f) a program code for instructing, if any information on default contents exists, generation of page information including the information on default contents.

According to another aspect of the invention, there is provided a storage medium storing thereon a display information fixing program to be executed on a display information fixing apparatus for transmitting display information to an information terminal having a display screen and an input unit, the program comprising:

(a) a program code for instructing analysis of a page template specified by a display information acquisition request from the information terminal,
(b) a program code for instructing acquisition of formatter specifying information and display attribute information on a formatter to control the arrangement of a plurality of contents from the page template,
(c) a program code for instructing acquisition of a formatter on the basis of the formatter specifying information, (d) a program code for instructing searching for information on a plurality of contents to be displayed on the page template, and (e) a program code for instructing generation of page information on the arrangement of the contents on the basis of information indicating the direction of arrangement contained in the display attributes.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 7 is a conceptual diagram for describing a page template in the preferred embodiment of the invention;

FIGS. 8A and 8B show message flows in a part creation procedure in the preferred embodiment of the invention;

FIG. 9 shows message flows in a part creation procedure in the preferred embodiment of the invention;

FIGS. 17A and 17B show message flows in a generating procedure for contents to be embedded into a display area in the preferred embodiment of the invention;

FIG. 19 is a diagram illustrating one example of a code to define a display area in the preferred embodiment of the invention;

FIG. 20 is a conceptual diagram of an arrangement rule DB in the preferred embodiment of the invention;

FIG. 24 is a diagram illustrating one example of parameters to be set in a display area;

FIG. 25 is a diagram for describing arrangement of parts in a display area;

FIG. 28 is a diagram illustrating one example of parameters to be set in a display area;

FIG. 29 is a diagram for describing arrangement of parts in a display area;

FIG. 30 is a diagram for describing arrangement of parts in a display area;

FIG. 33 is a conceptual diagram for describing creation of an array of parts in the preferred embodiment of the invention;

FIG. 34 is a conceptual diagram for describing creation of an array of parts in the preferred embodiment of the invention;

FIG. 35 is a conceptual diagram for describing creation of an array of parts in the preferred embodiment of the invention;

FIG. 38 is a conceptual diagram of an arrangement rule DB in the preferred embodiment of the invention;

FIG. 39 shows message flows in an event subscription procedure in the preferred embodiment of the invention;

FIG. 40 is a conceptual diagram showing information managed by a user management DB in the preferred embodiment of the invention;

FIG. 41 is a conceptual diagram showing items managed by a subscription DB in the preferred embodiment of the invention;

FIGS. 42A and 42B show message flows in an event monitoring and notification procedure in the preferred embodiment of the invention;

DETAILED DESCRIPTION OF THE INVENTION

A. Hardware configuration

Figure 1:
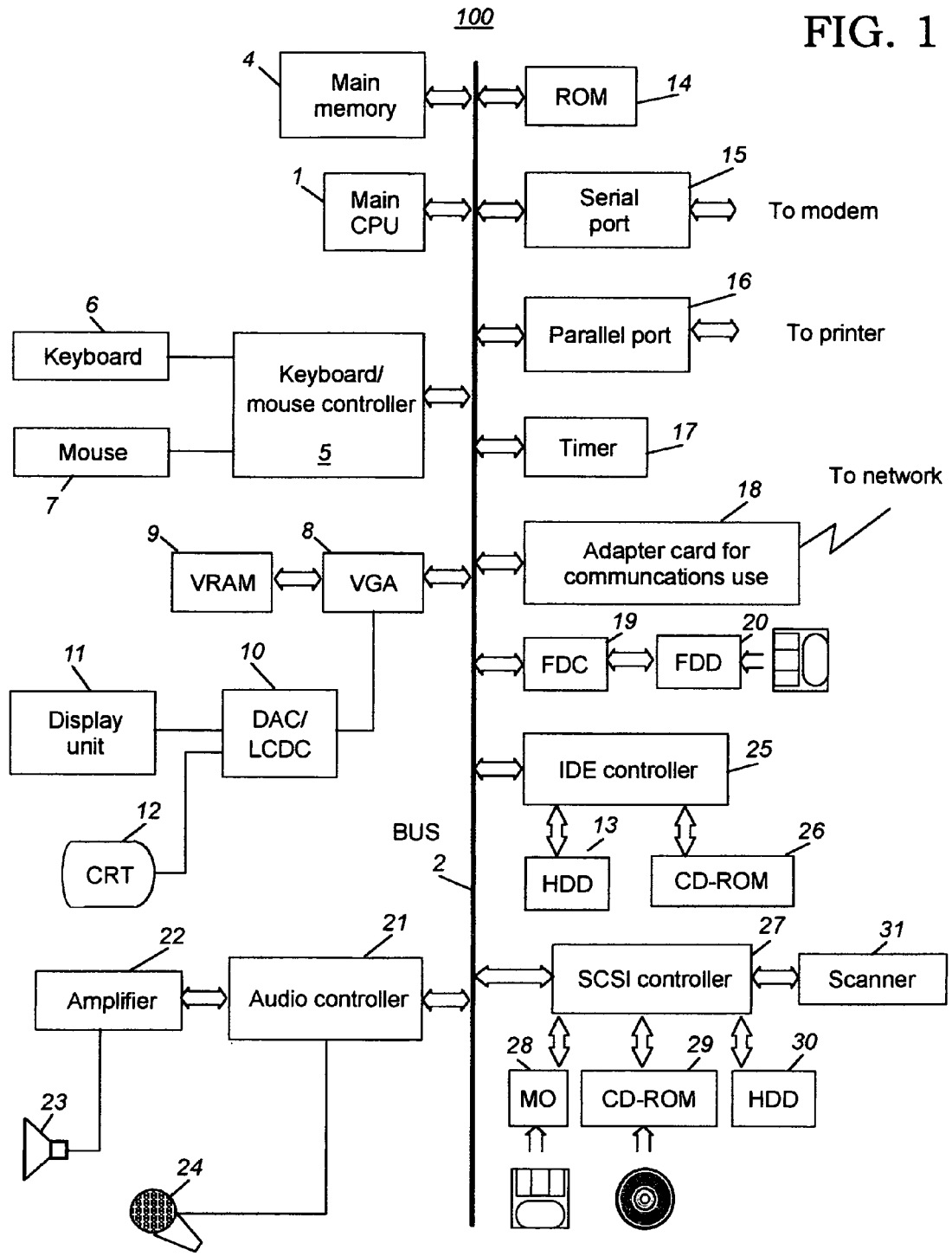
FIG. 1 is a block diagram of one embodiment of hardware configuration of an information terminal, web server and client machine according to the present invention.
Figure 2A:
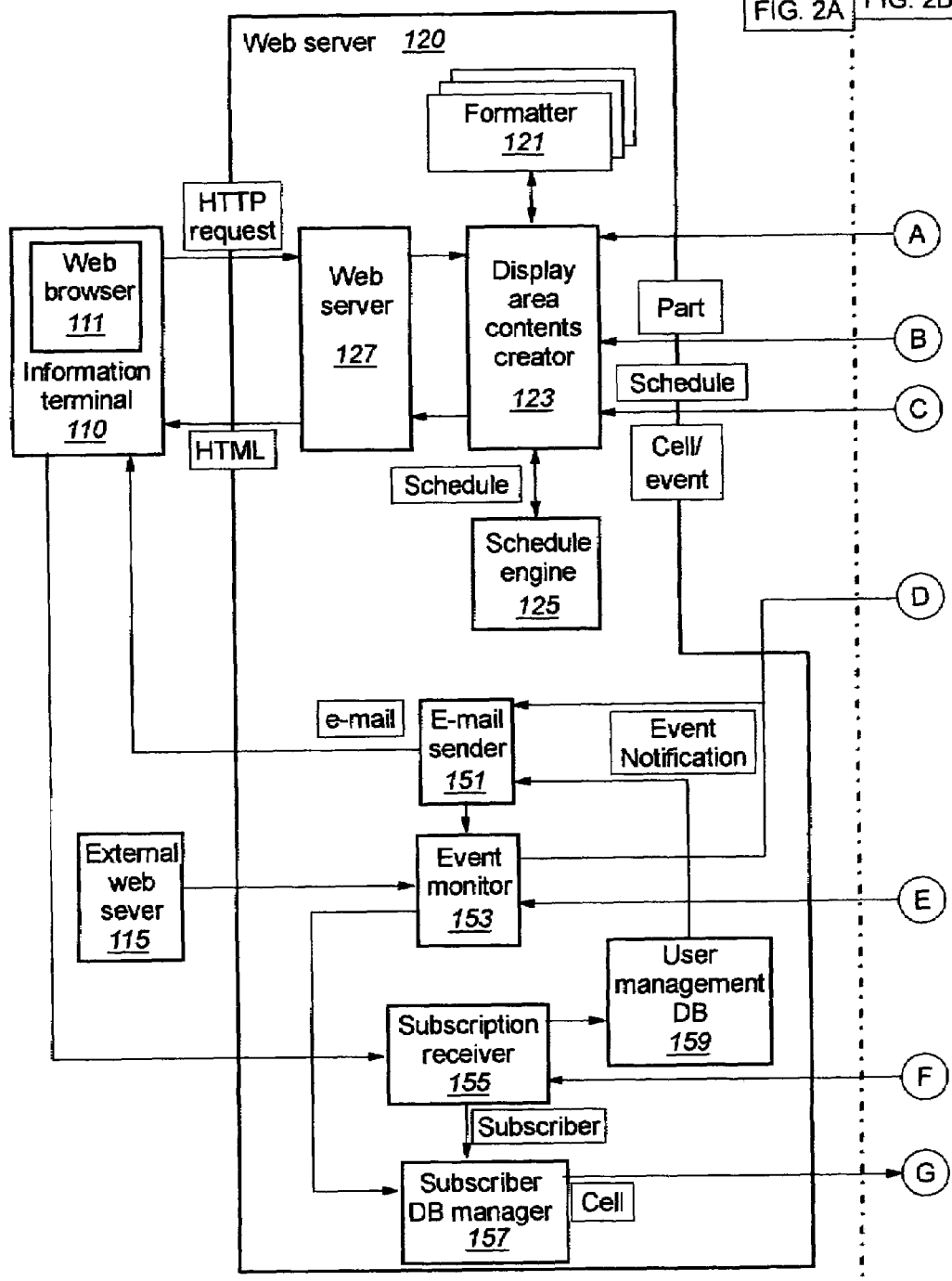
FIGS. 2A and 2B are a block diagram of processing elements in a preferred embodiment of the invention.
Figure 2B:
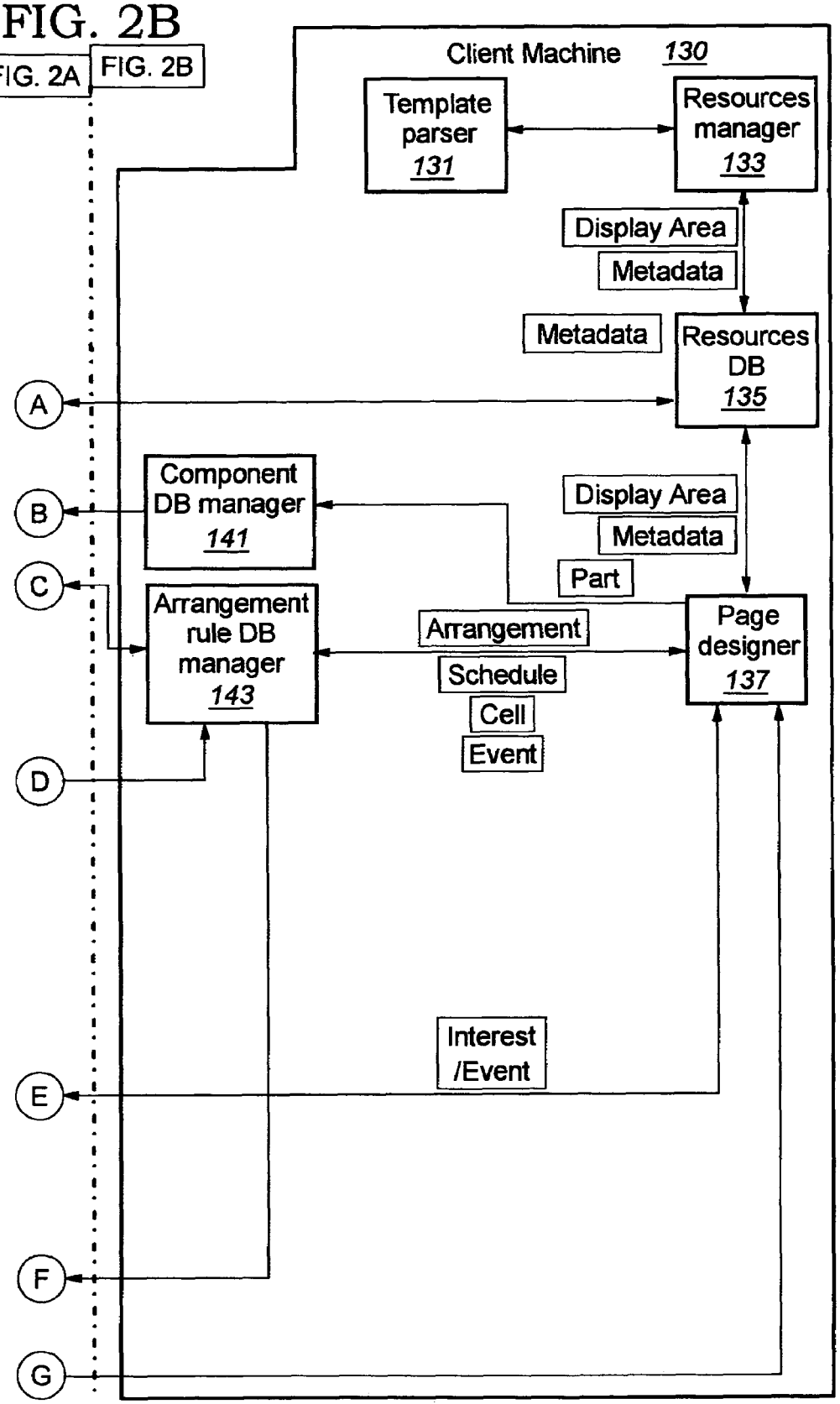

FIG. 1 shows a schematic view of hardware configuration for realizing an information terminal 110, a web server 120 and a client machine 130 (See FIGS. 2A and 2B, collectively FIG. 2) according to the present invention. The information terminal 110, the web server 120 and the client machine 130 include a central processing unit (CPU) 1 and a memory 4. To the CPU 1 and the memory 4 are connected hard disk units 13 and 31 as auxiliary memory units via a bus 2 and the like. Floppy disk units (or medium drive units 26, 28, 29 and 30 such as MOs 28 or CD-ROMs 26 and 29) 20 are connected to the bus 2 via a floppy disk controller (or various controllers including an IDE controller 25 and an SCSI controller 27) 19.

Into the floppy disk unit (or medium drive units 26, 28, 29 and 30 such as MOs and CD-ROMs) 20 are inserted floppy disks(or media such as MOs or CD-ROMs), and these storage media such as floppy disks or the hard disk unit 13, the ROM 14 or the like can record, working in concert with an operating system, computer program codes for giving commands to the CPU and the like and implementing the invention, and they are executed by being loaded into the memory 4. These computer program codes can be compressed or divided into a plurality to be recorded into a plurality of media.

The information terminal 110, the web server 120 and the client machine 130 can further be put together into a system provide with user interface hardware, and this user interface hardware would include, for instance, a pointing device (mouse, joystick, track ball or the like) 7 for inputting screen position information, a keyboard 6 for supporting key inputting, and displays 11 and 12 for presenting image data to the user. A loudspeaker 23 receives audio signals from an audio controller 21 via an amplifier 22, and outputs them aurally.

These information terminal 110, web server 120 and client machine 130 can communicate with other computers or the like via a serial port 15 and a modem or a communication adapter 18, such as a token ring.

The present invention can be implemented with a conventional personal computer (PC), a workstation, or a computer incorporated into a household electrical appliance such as a television receiver or a facsimile machine, or a combination thereof. However, these constituent elements are cited merely as examples, but all these constituent elements are not indispensable for implementation of the invention. Particularly, since the invention is intended for dynamic alteration of contents to be embedded into a page template, such constituent elements as the audio controller 21, the amplifier 22 and the loudspeaker 23 are dispensable in some modes of carrying out the invention.

The operating system on the side of the information terminal 110, the web server 120 and the client machine 130 is not limited to any specific operating system environment, but realization is possible with what supports GUI multi-window environment as a standard function, such as Windows NT (a trademark of Microsoft), Windows 9x (a trademark of Microsoft), Windows 3.x (a trademark of Microsoft), OS/2 (a trademark of IBM), MacOS (a trademark of Apple), or Linux (a trademark of Linus Torvlds) or X-WINDOW system (a trademark of MIT) on AIX (a trademark of IBM), one for a character base environment such as PC-DOS (a trademark of IBM) or MS-DOS (a trademark of Microsoft), a real time OS such as OS/Open (a trademark of IBM) or VxWorks (a trademark of Wind River Systems, Inc.) or an OS incorporated into a network computer such as Java OS.

B. System configuration

FIG. 2 is a functional block diagram illustrating the system configuration of a system including a web page generating system in a preferred embodiment of the present invention.

In the preferred embodiment of the invention, in an information terminal 11 is installed a web browser 111. The web browser 111 designates URL, and transmits an HTTP request to a prescribed web server 120. It also receives a response transmitted from the web server 120, and displays it on a display screen.

On the other hand, the web server machine 120 in the preferred embodiment of the invention is provided with a formatter 121, a display area contents creator 123, a schedule engine 125, a web server program 127, an e-mail sender 151, an event monitor 153, a subscription receiver 155 and a subscriber DB manager 157.

The formatter 121 formats contents into a prescribed form on the basis of attribute information in which various resources are set in a display area to be described below (including the display position, height, width, style and format).

The display area contents creator 123 searches an arrangement rule DB for candidates of contents to be embedded into a page template, and pinpoints contents to be displayed out of the candidates according to such conditions as schedule and customer cell. It also hands over to the formatter 121 the contents to be displayed and information set in the display area, receives formatted contents, embeds them into the page template, and returns them to the web server 127.

The schedule engine 125 judges whether or not the time of accessing by the user satisfies the conditions of schedule definition. The schedule definition can also set conditions combining such items as the day of the week and the time range in addition to the period.

The subscription receiver 155 provides the user with a list of published event parts registered with an arrangement rule DB manager 143 to be described below, and registers into a subscriber DB 157 the ID, condition formula and notification form of the parts selected by the user, together with user information extracted from a user management DB 159.

The event monitor 153 periodically monitors the contents of this subscriber DB 157 to check external or internal resources to be monitored (the external web server 115 in the illustrated example). If the checked resource meets a prescribed condition, accesses the subscriber DB 157 with that condition as the key, references the notification form, and executes processing matching the notification form.

The e-mail sender 151 takes out e-mail parts from the arrangement rule DB 143 in response to an instruction from the event monitor 153, generates an e-mail by embedding prescribed information, and transmits it. The user management DE 159 manages customer information.

The client machine 130 is provided with a template parser 131, a resources manager 133, a resources DB manager 135, a page designer 137, a component DB manager 141, and an arrangement rule DB manager 143.

The template parser 131 analyzes the page template, detects a display area contained in the page template, and extracts its attributes (including the display position, height, width, style and format).

The resources manager 133 provides the operator with a GUI for registering/altering/deleting JavaBeans. In the preferred embodiment of the invention, objects such as the page template, banner, Telop and button, and the customer cell (where the contents to be displayed vary with the user, a user group for whom different information is to be displayed is called a customer cell) are also registered into the resources DB as JavaBeans. Each Bean has a Java object code and attributes, and the Java object code is caused to be executed and a list of attributes held by the Bean to be taken out by making an inquiry with a common interface. In the case of a banner Bean for instance, it has such attributes as the type of Bean, part name, image file to be displayed, URL of link destination, and explanatory statement. In the preferred embodiment of the invention, the page template is also registered as a JavaBean in order to enhance versatility.

The resources DB manager 135 manages the resources DB. The resources DB manages parts before attribute information is set. In the preferred embodiment of the invention, for a part managed by the resources DB, only its type (as to the page template, Telop, banner and so forth) and bibliographical items are registered, but no substantive attributes such as what kind of image is to be displayed are registered. This configuration contributes to increasing the speed of retrieval among other advantages.

The component DB manager 141 manages the component DB. The component DB manages attribute information on parts. Where the part is a banner Bean for instance, it manages such items of information as the part name, image file to be displayed, URL of link destination, and explanatory statement.

The arrangement rule DB manager 143 manages the arrangement rule DB. The arrangement rule DB stores information to associate display areas with parts, schedule information, and information for determining the possibility of publishing. The operator can also obtain a list of parts stored in this DB by using the page template name and the display area name as the keys.

The page designer 137 provides the operator with a GUI which makes possible for a part to undergo arrangement registration, schedule setting, and registration/alteration of publishing decision or the like.

Figure 3:
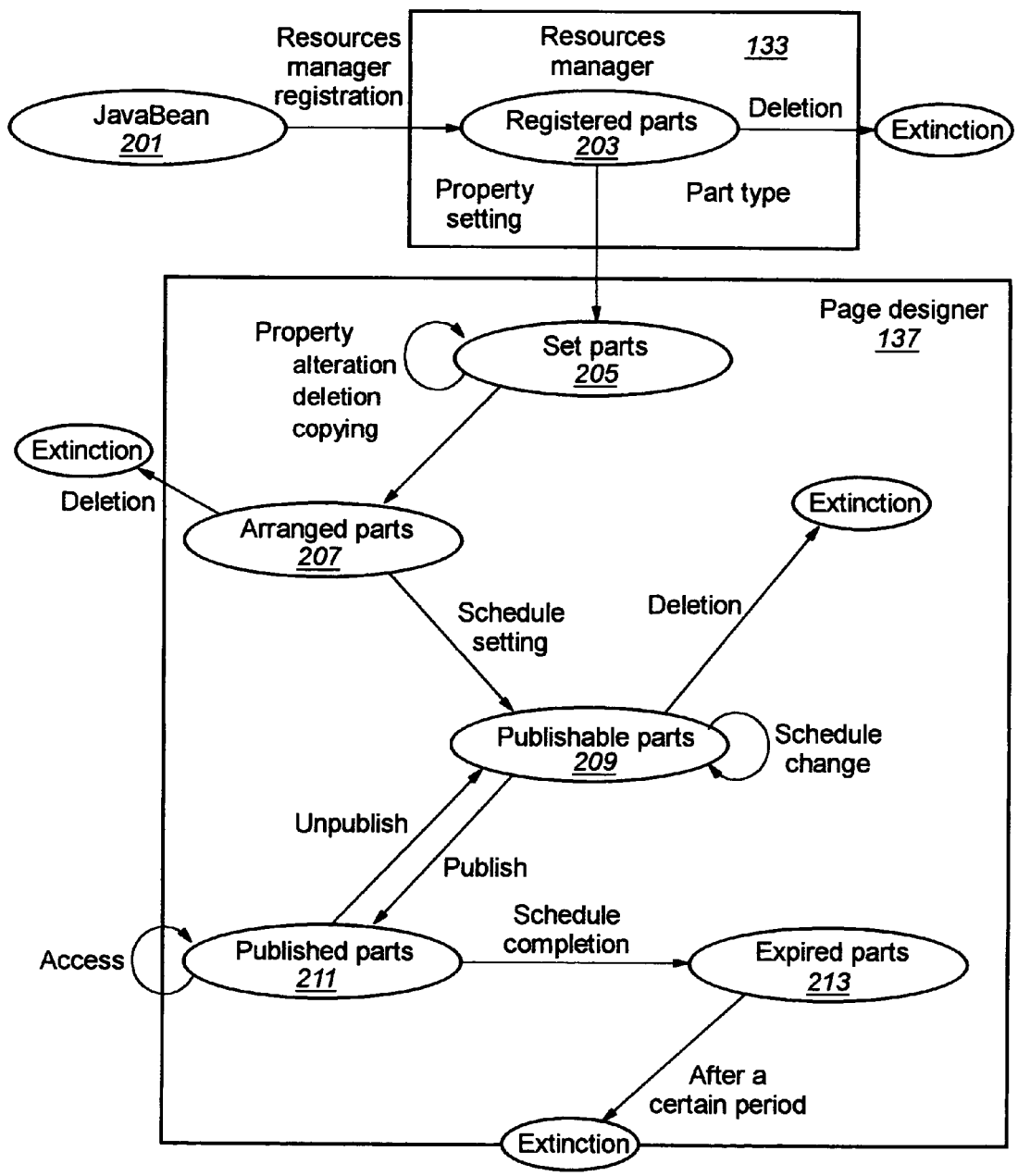
FIG. 3 is a conceptual diagram illustrating the state transitions of parts in the preferred embodiment of the invention.

FIG. 3 is a conceptual diagram illustrating the state transitions of parts in the preferred embodiment of the invention. In the figure, registered parts 203 (class) consist of information (metadata) registered under the management of the resources manager 133, and permit alteration and deletion. These registered parts 203 are stored into the resources DB 135. At this stage, for any such part, only its type (as to the page template, Telop, banner and so forth) and bibliographical items are registered, but no substantive attributes such as what kind of image is to be displayed are registered.

Set parts 205 (instance) associate registered parts 203 with set information (banner, Telop, list and so forth) according to the property of each part, and permit alteration and deletion. These set parts 205 are stored into the arrangement rule DB 143. In this state, the set parts 205 have, if the part is a banner Bean for instance, such attributes as the type of Bean, part name, image file to be displayed, URL of link destination, and explanatory statement. The attributes are stored into the component DB. In the preferred embodiment of the invention, in setting the properties of a part, the operator can reference and select contents registered in the resources DB.

Arranged parts 207 are associated with the set parts 205 with respect to display areas, and permit deletion. The set parts 205 are stored into the arrangement rule DB 143.

Publishable parts 209 are arranged parts having undergone schedule setting, and permit alteration and deletion. These publishable parts 209 are stored into the arrangement rule DB 143. Published parts 211 are publishable parts having been published. They can be returned to publishable parts 209 by unpublishing operation. These publishable parts 209 are stored into the arrangement rule DB 143. Expired parts 213 are either publishable parts 209 or published parts 211 whose schedule has expired.

Incidentally, while in the preferred embodiment of the invention information to associate a display area with parts is stored in the arrangement rule DB with a view to reducing the time required to retrieve parts arranged in a prescribed display area, the invention can as well be implemented by assigning such information to individual parts. Further, out of the parts arranged in the prescribed display area, the schedule is also held incidental to individual arranged data in the arrangement rule DB to reduce the time taken to determine what satisfies the schedule condition, the invention can also be implemented by assigning this information to individual parts. Similarly, information on whether or not a given part is published is managed by the arrangement rule DB, it may as well be managed by the component DE as attributes of part.

Whereas each functional block shown in FIG. 2 has been described so far, these functional blocks are logical functional block, and it is not meant that each of them is realized by an integrated set of hardware or software, but they can be combined or realized by a common set of hardware or software. Especially, while the web server 120 and the client machine 130 are mounted on different machines in this embodiment, the functions described with reference to the client machine 130 can as well be assigned to the web server 120. Further, all the functional blocks shown in this FIG. 2 are not indispensable constituent elements for the invention.

C. Procedures of operation

C-1. Registration of contents

Figure 4:
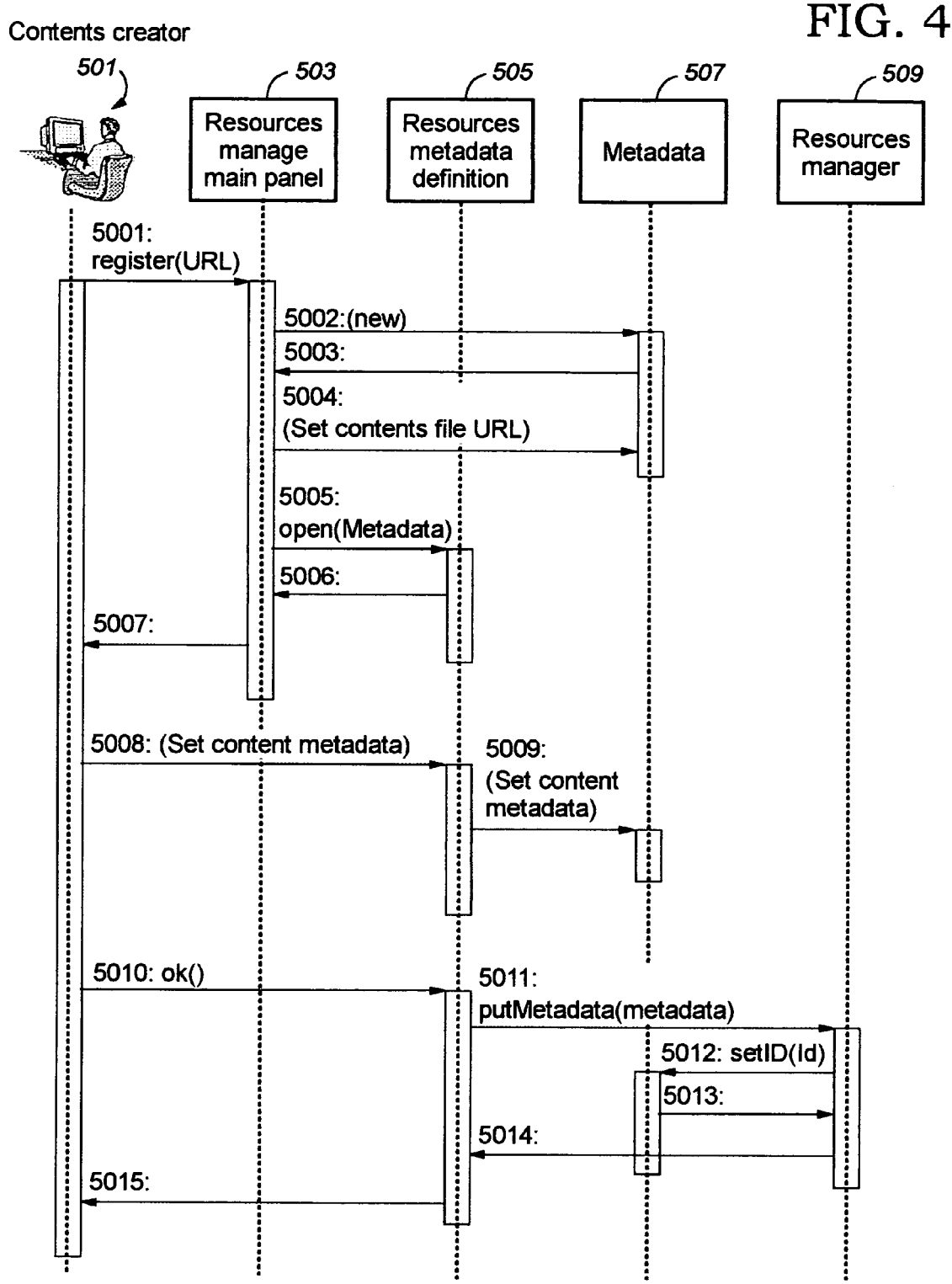
FIG. 4 shows message flows in a contents registration procedure in the preferred embodiment of the invention.

FIG. 4 shows message flows in the contents registration procedure in the preferred embodiment of the invention. As shown in FIG. 4, the contents creator 501 opens a resources manager main panel 503 provided by the resources manager 133, designates created contents (in the preferred embodiment of the invention the location of the contents—URL—is designated), and registers the contents (message 5001).

The resources manager main panel 503, in response to this, generates metadata 507 on the memory (messages 5002 and 5003). If the generation has been completed normally, the URL of the contents is registered into the metadata 507 (message 5004). The resources manager main panel 503 then opens a resources metadata definition panel 505 (messages 5005, 5006 and 5007).

The contents creator 501 enters bibliographical items (including the creator, the date of creation and a description of contents) into this resources metadata definition panel 505. Further in the preferred embodiment of the invention, such items as the date and hour of registration are automatically set, and the type of contents can be selected from a pulldown menu. When the contents creator 501 presses an OK button on the resources metadata definition panel 505, metadata (including information on the link to the contents) are written into the resources DB 509, and the inherent ID of the contents is generated and set, associated with the metadata, in the resources DB 509 (messages 5010, 5011, 5012, 5013, 5014 and 5015).

C-2. Registration of page template

Figure 5:
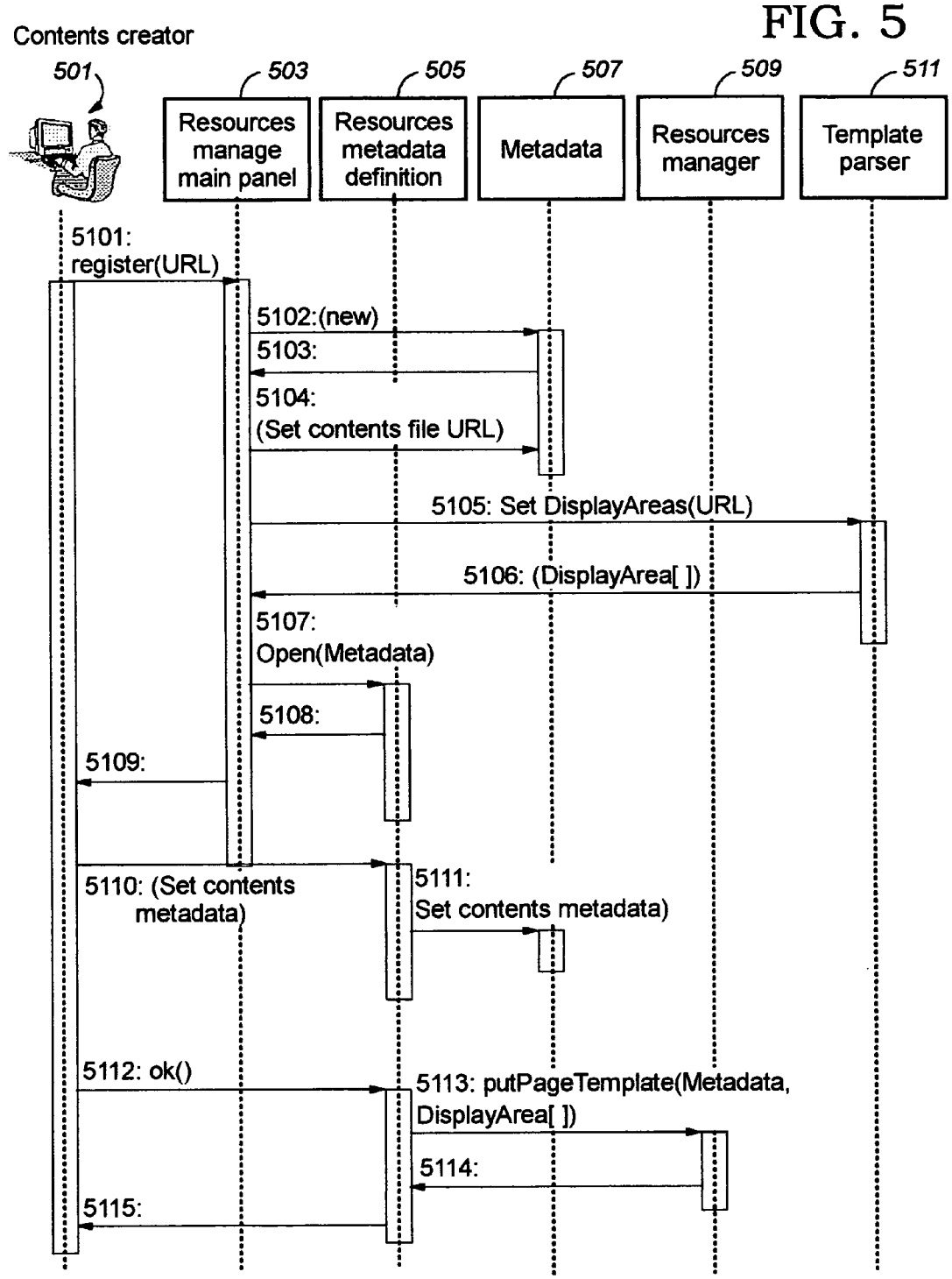
FIG. 5 shows message flows in a page template registration procedure in the preferred embodiment of the invention.

FIG. 5 shows message flows in the page template registration procedure in the preferred embodiment of the invention. As shown in FIG. 5, the contents creator 501 opens a resources manager main panel 503 provided by the resources manager 133, designates a page template (in the preferred embodiment of the invention the location of the contents—URL—is designated), and registers the page template (message 5101).

The resources manager main panel 503, in response to this, generates metadata 507 on the memory (messages 5102 and 5103). If the generation has been completed normally, the URL of the contents is registered into the metadata 507 (message 5104).

Next, the resources manager main panel 503 hands over the URL to the template parser 511, and requests analysis of a display area (message 5105). The template parser 511 accesses the page template 250 as shown in FIG. 7, and analyzes the display area contained in the page template 250. In the preferred embodiment of the invention, it searches for SERVLET tags 261 and 263 contained in the HTML and, by detecting a character string 'code="icdacrt" ', recognizes it as a servlet defining the display area.

If a display area is recognized, such items of information on each display area contained in a page template as the position in the sequence of display areas contained in that page template, display area name, display position, display style, width and height are recognized (message 5106).

Then the resources manager main panel 503 opens the resources metadata definition panel 505 (messages 5005, 5006 and 5007). The contents creator 501 enters bibliographical items (including the creator, the date of creation and a description of template) into this resources metadata definition panel 505. Further in the preferred embodiment of the invention, such items as the date and hour of registration are automatically set.

When the contents creator 501 presses the OK button on the resources metadata definition panel 505, the resources metadata definition panel 505 writes metadata (including information on the link to the contents) and display area information recognized by the template parser 131 (such items of information as the display area number, display area name, display position, display style, width and height) into the resources DH 509 (messages 5112, 5113, 5114 and 5115).

C-3. Registration of formatter

Figure 6:
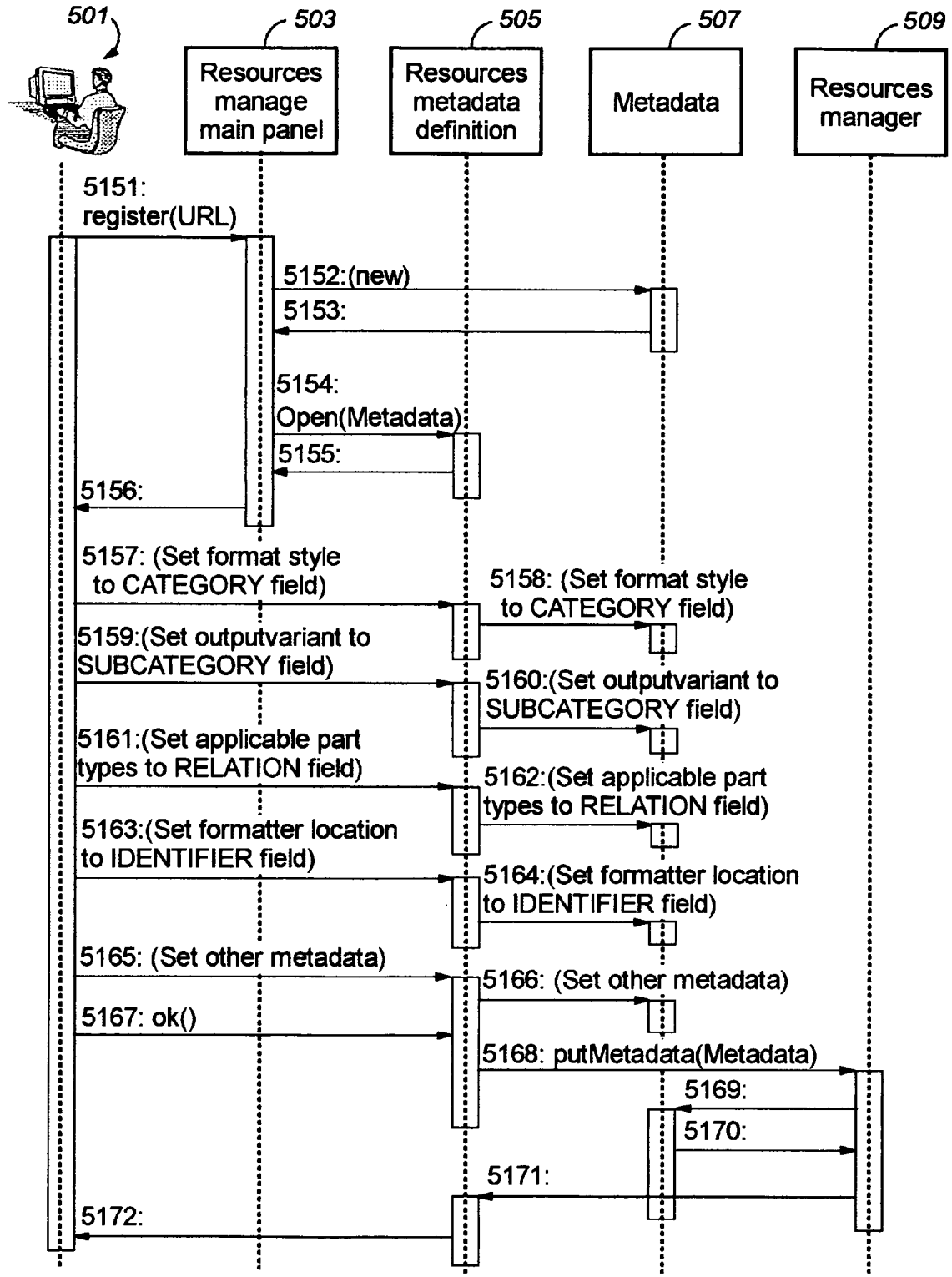
FIG. 6 shows message flows in a formatter object registration procedure in the preferred embodiment of the invention.

FIG. 6 shows message flows in the formatter object registration procedure in the preferred embodiment of the invention. As shown in FIG. 6, the contents creator 501 opens a resources manager main panel 503 provided by the resources manager 133, designates a formatter object (in the preferred embodiment of the invention the location of the contents—URL—is designated), and registers the formatter (message 5151).

The resources manager main panel 503, in response to this, generates metadata 507 on the memory (messages 5152 and 5153). Then the resources manager main panel 503 opens the resources metadata definition panel 505 (messages 5154 to 5156). The contents creator 501 enters into this resources metadata definition panel 505 the format style (designates outputting of banners in a matrix form and so forth), output type (such as HTML, FAX or PostScript), adaptable part types (banner, Telop and so forth), formatter location (the location of the program to be actually executed) and other bibliographical items (messages 5157 to 5164). In the preferred embodiment of the invention, such items as the date and hour of registration are automatically set.

When the contents creator 501 presses the OK button on the resources metadata definition panel 505, the resources metadata definition panel 505 writes metadata (including information on the link to the format execution program) into the resources DE 509 (messages 5168 to 5172).

C-4. Setting of attributes of part (creation of part)

Figure 10:
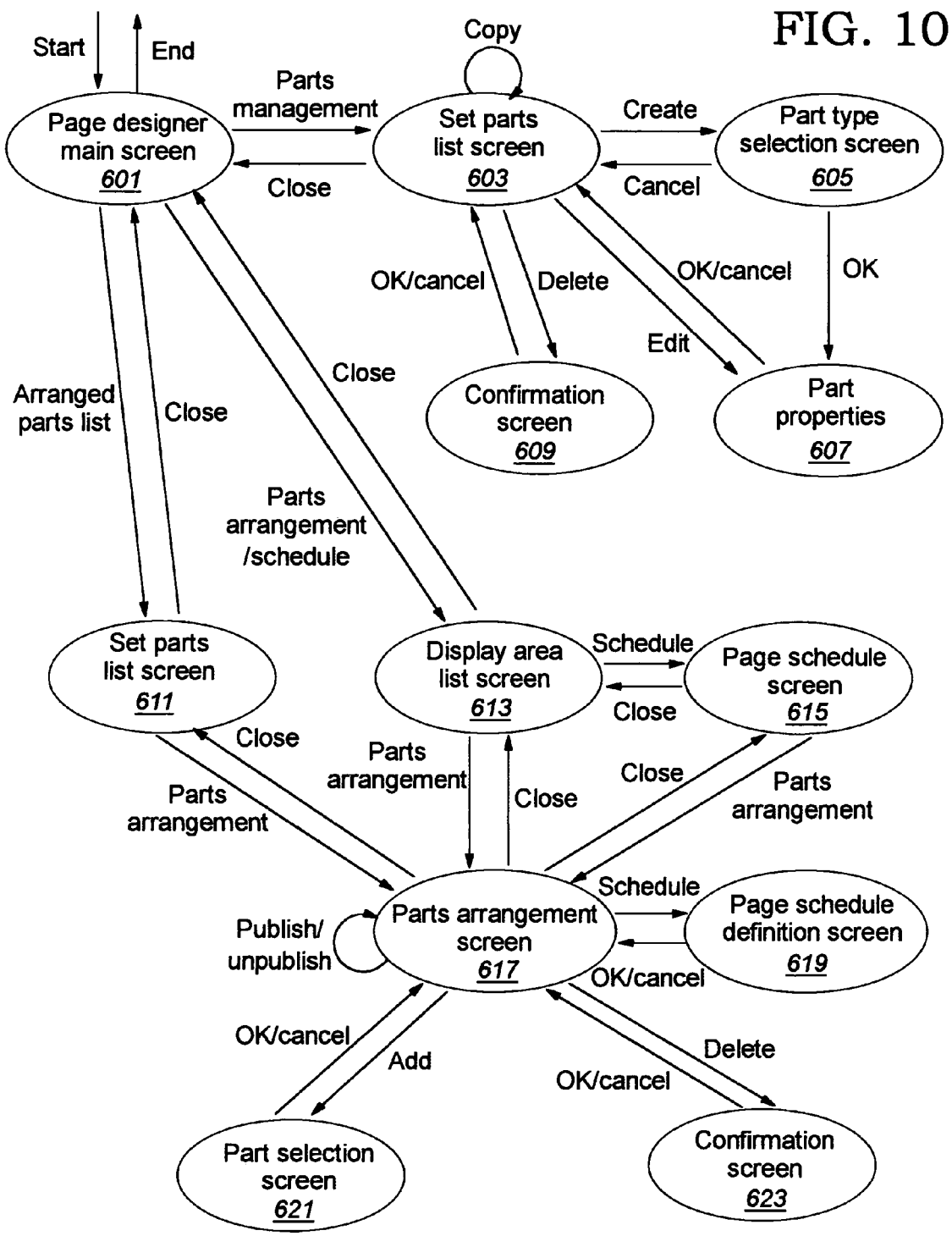
FIG. 10 is a conceptual diagram illustrating the page designer's screen configuration in the preferred embodiment of the invention.

FIGS. 8A and 8B (Collectively FIG. 8) and FIG. 9 show message flows in the part creation procedure in the preferred embodiment of the invention. As shown in FIG. 8, the web page creator 521 opens from the page designer main screen a list of set parts screen 523 (message 5201), and as it selects part creation (message 5202), a part type selection screen 525 is opened. The screen configuration of a page designer 137 in the preferred embodiment of the invention is illustrated in FIG. 10.

As the web page creator 521 selects a part type in the parts type selection screen 525, metadata on registered parts fitting that part type are acquired from the resources DB 135 (messages 5203 and 5204). Further, a distinct part ID and part name are assigned to each part type (messages 5205, 5206, 5207, 5208 and 5209).

Confirmation of a part type by the web page creator 521 (message 5210) results in generation of a new part 531 (messages 5211 and 5212), metadata and the creator name of the registered part are set (messages 5213 to 5216), and a part attribute definition panel 533 is opened (messages 5217 to 5219).

The web page creator 521 sets on this part attribute definition panel 533 prescribed properties (a list of unregistered Telop messages, URL of link destination and so on), part name and explanatory statement (messages 5221 to 5227).

The web page creator 521 can as well open a contents selection panel 537 from this part attribute definition panel 533 and access images, texts and the like registered in the resources DB 527 (messages 5228 to 5234). If it is a banner part, for instance, a list of images to be displayed and URL of link destination among others can be obtained or, if it is a Telop part, a list of messages to be outputted can be obtained.

When the web page creator 521 selects prescribed contents from a list of contents, contents information stored in the resources DB 135 is registered as part properties (messages 5235 to 5241). Then, as the web page creator 521 makes final confirmation on the part attribute definition panel 533, part information, parts ID and alteration history information are registered into the component DB 535 (messages 5242 to 5249).

C-5. Arrangement of parts

Figure 11A:
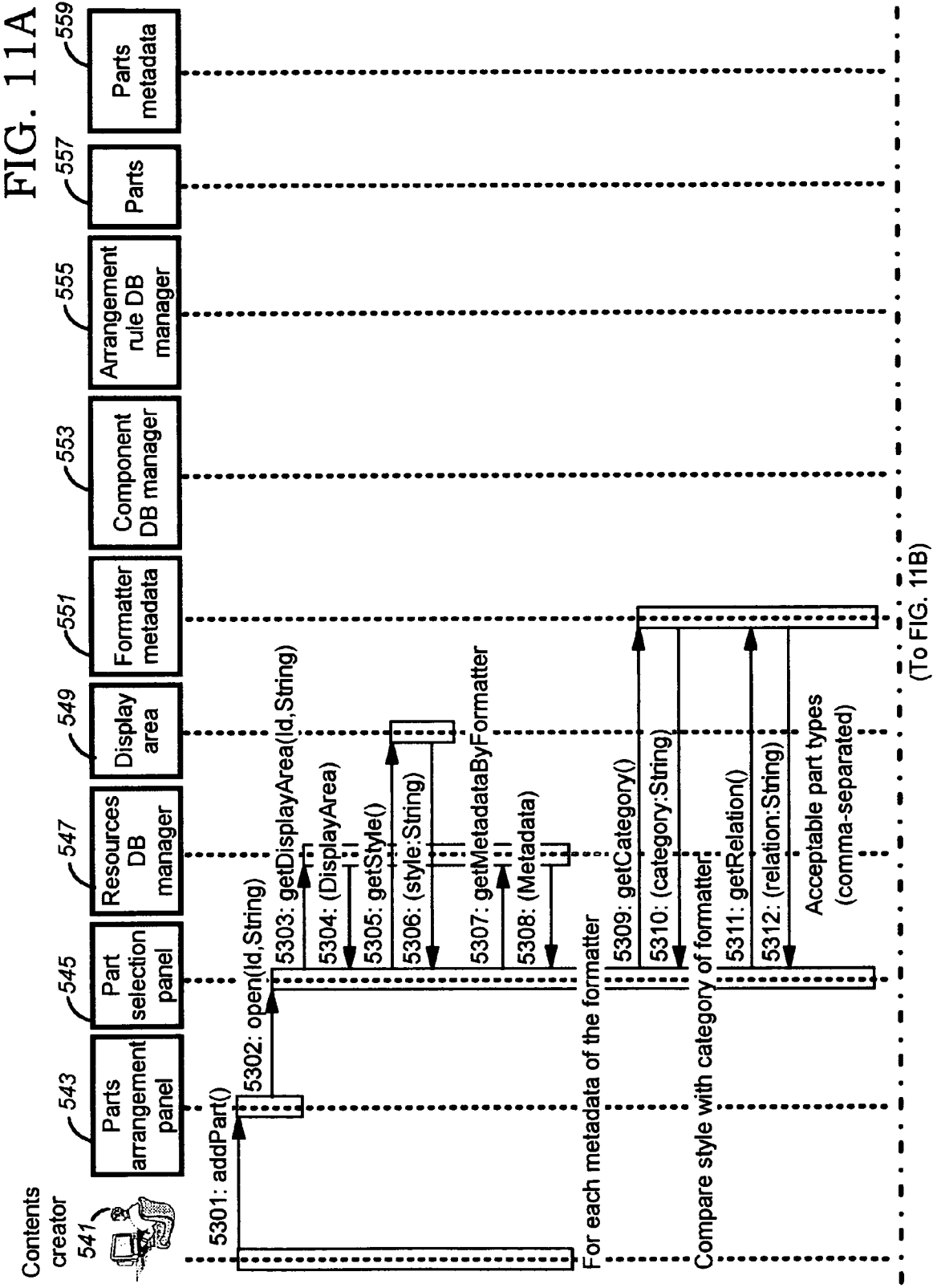
FIG. 11 shows message flows in a parts arrangement procedure in the preferred embodiment of the invention.
Figure 12:
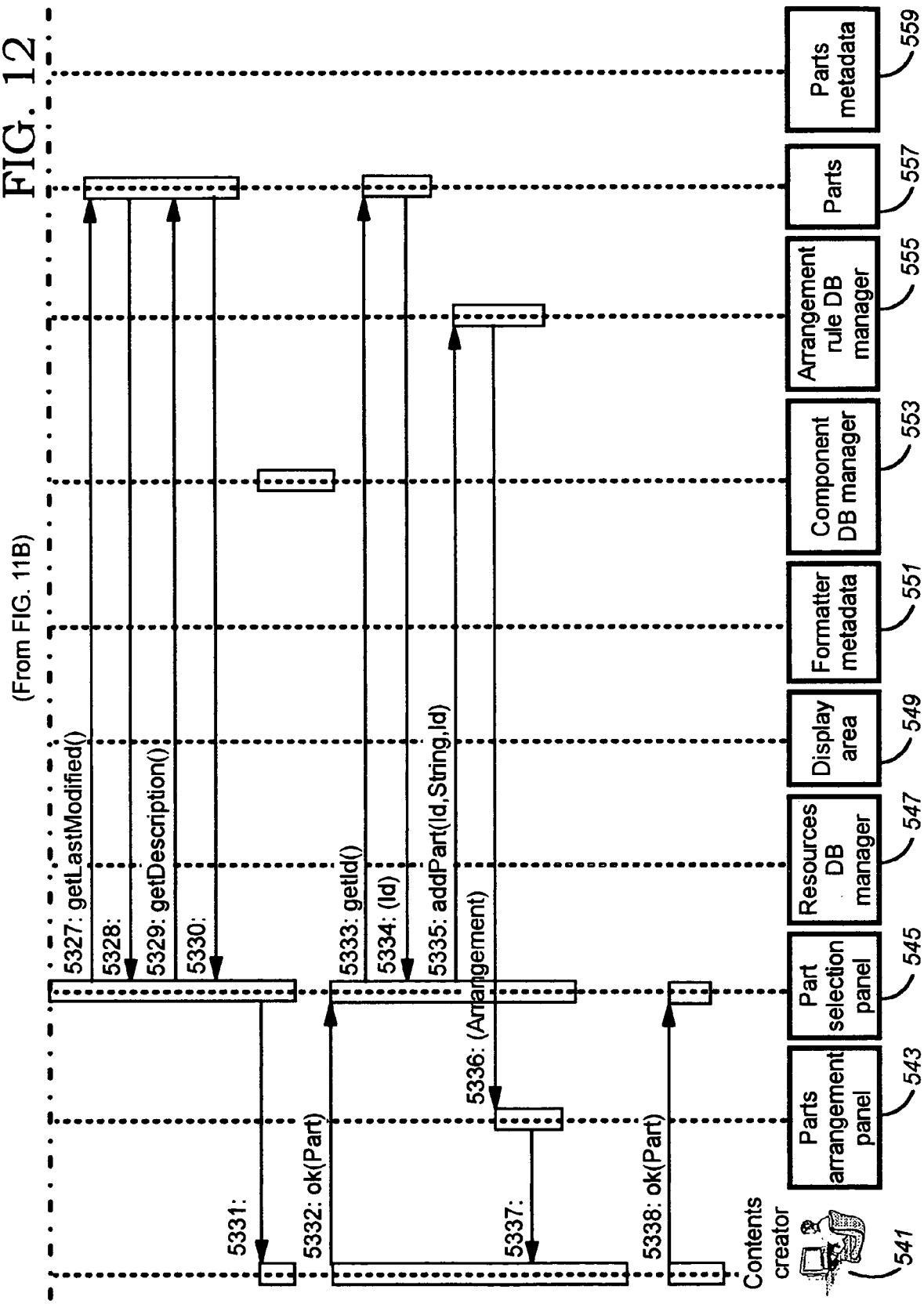
FIG. 12 shows message flows in a parts arrangement procedure in the preferred embodiment of the invention.

FIGS. 11A and 11B (Collectively FIG. 11) and FIG. 12 show message flows in the parts arrangement procedure in the preferred embodiment of the invention. As shown in FIG. 11, the web page creator 531 first accesses a part selection panel 543 via a part arrangement panel 533 (messages 5301 and 5302), and acquires a display area in which to arrange parts registered in the resources DB 537 (messages 5303 and 5304). Then it acquires attribute information (including the display position, height, width, style and format) on the display area (messages 5305 and 5306).

In the preferred embodiment of the invention, items of attribute information on a display area include what is known as a display area style. This display area style is an item of attribute information to designate the form of displaying a part (by using HTML) selected (according to the conditions of cell and schedule). Available display styles include, for instance, bannerFlow and itemizedList.

With each display style, the type of display-shapable parts is associated in advance by a resources manager. For instance, Banner part (image file with a link) is associated with the bannrFlow style, and LisIitem part (1 line text with a link), with itemizedList. In the preferred embodiment of the invention, this association is designated when a formatter to generate HTML according to each display style is registered with a resources manager.

A list of parts that can be pasted in a display area shows the type of parts displayable in the display area, selected out of set parts on the basis of information associating a display area style with displayable part types (messages 5303 to 5331).

Then, as the web page creator 531 selects a desired part out of this list, the part is associated with a display area, and the association is stored into the arrangement rule DB 553.

C-6. Addition of parts to display area

Figure 13:
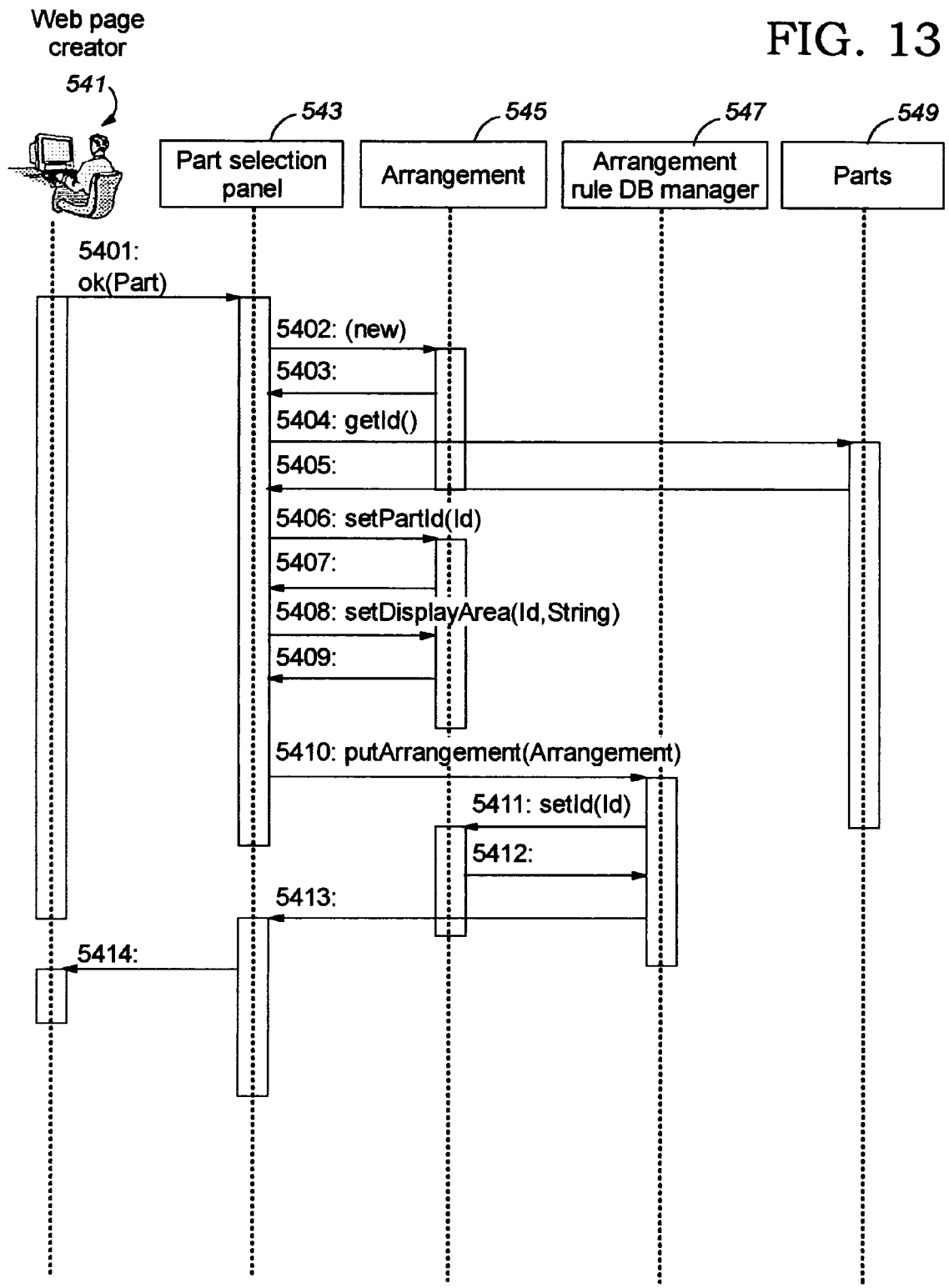
FIG. 13 shows message flows in a procedure of adding parts to a display area in the preferred embodiment of the invention.
Figure 14:
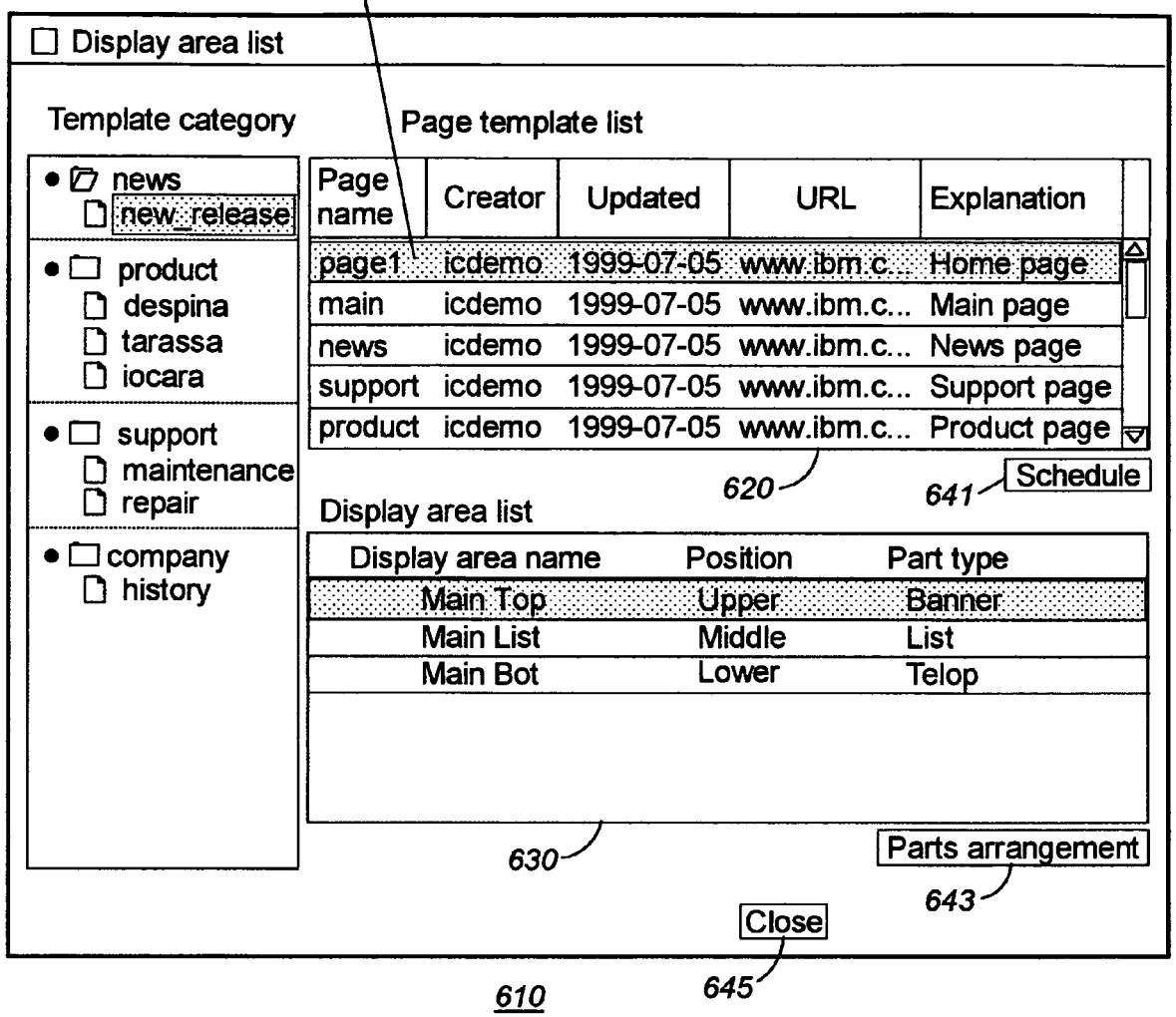
FIG. 14 is a conceptual diagram of a part selection panel in the preferred embodiment of the invention.

FIG. 13 shows message flows in the procedure of adding parts to a display area in the preferred embodiment of the invention. In the preferred embodiment of the invention, there is a separate GUI panel for selecting and associating display areas and parts as illustrated in FIG. 14. When a display area 621 is selected from this display area list 630 on this panel and a "parts arrangement" button 643 is pressed, messages 5301 to 5331 in the sequential FIGS. 11 and 12 are processed. FIG. 13 shows subsequent message flows.

When the web page creator 541 selects a prescribed part out of the parts list displayed on the part selection panel 543 (message 5401), an arranged object 545 is newly generated on the memory. Then, a part ID and a display area ID are set on this generated arranged object 545 (messages 5404 to 5409), and written into the arrangement rule DB (messages 5410 to 5414).

C-7. Schedule definition

Figure 15:
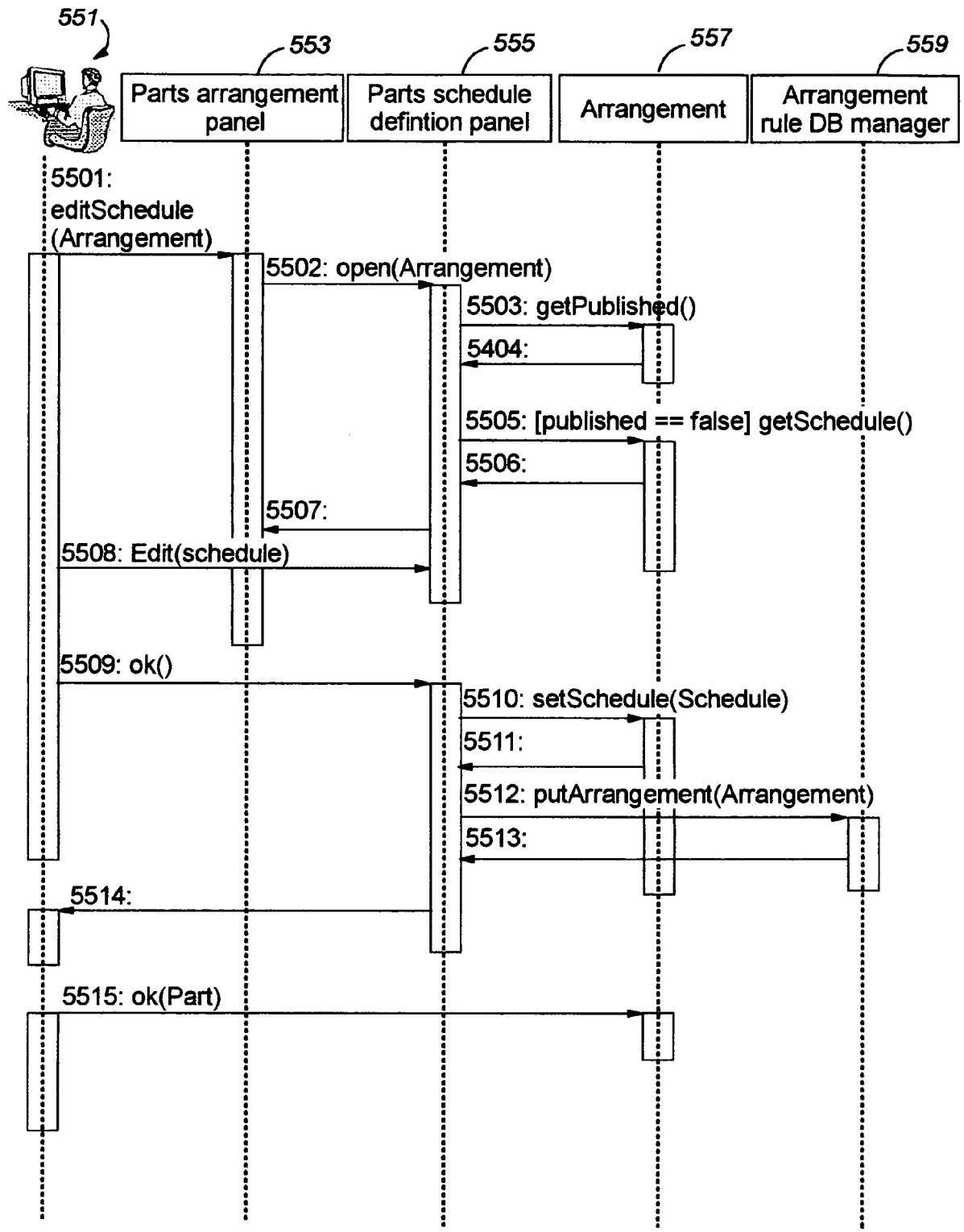
FIG. 15 shows message flows in a schedule definition procedure for arranged parts in the preferred embodiment of the invention.

FIG. 15 shows message flows in the procedure of schedule definition of arranged parts in the preferred embodiment of the invention. As illustrated in FIG. 15, the web page creator 551 first designates a set of a display area and parts in the parts arrangement panel 553, opens a schedule definition panel 555 (messages 5501 and 5502), and accesses an arranged part to undergo schedule registration (revision) by the web page creator 551 (messages 5503 and 5504).

If that arranged part is not published, a schedule currently set for the part is acquired to newly set or alter a schedule (message 5505). If no schedule is set, a schedule registration screen with no data thereon will be outputted or, if a schedule is already set, there will emerge a schedule revision screen. In the preferred embodiment of the invention, no schedule alteration can be done unless no part is published (in an unpublished state). This is intended to prevent a part display schedule from being changed when general users are watching it.

C-8. Publishing decision

Figure 16:
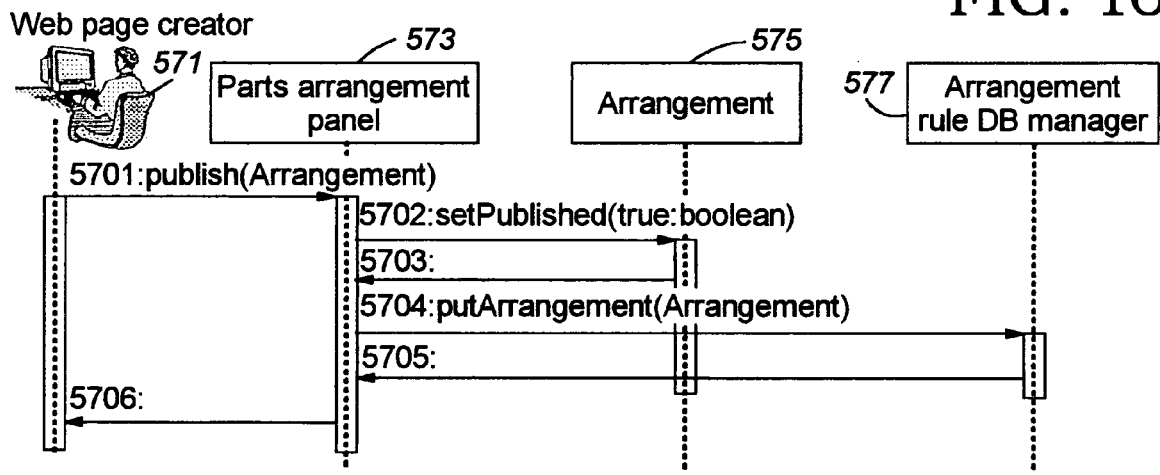
FIG. 16 shows message flows in a publishing decision procedure for contents to be embedded into a display area in the preferred embodiment of the invention.

FIG. 16 shows message flows in the procedure of publishing decision on contents to be embedded into a display area in the preferred embodiment of the invention. As illustrated in FIG. 16, as the web page creator 571 designates a display area and parts on a part arrangement panel 573 and designates publishing, a publish flag is set on an arranged object 575 (messages 5701 to 5703), and the contents of the arranged object are written into the arrangement rule DB. Cancellation of publishing (unpublishing) can be designated in a similar procedure.

C-9. Generation of contents for display area

Figure 18:
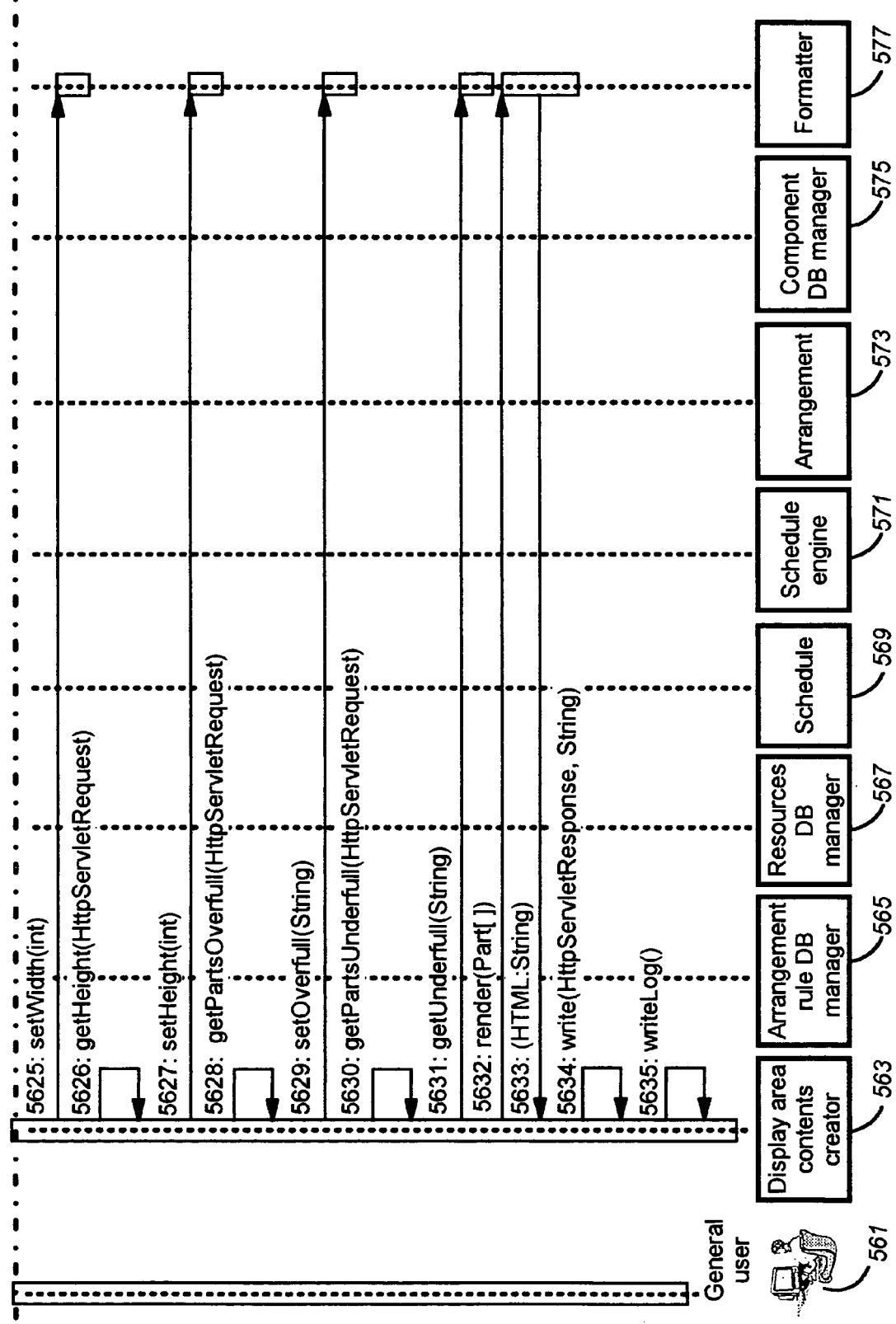
FIG. 18 shows message flows in a generating procedure for contents to be embedded into a display area in the preferred embodiment of the invention.

FIGS. 17A and 17B (Collectively FIG. 17) and FIG. 18 show message flows in the procedure of generating contents to be embedded into a display area in the preferred embodiment of the invention. As illustrated in FIG. 17, as a user 561 transmits an HTTP request from the web browser 111 to the web server 127, the web server 127 acquires a page template matching that HTTP request.

The web browser 127 detects a servlet tag contained in the page template, hands over a code (FIG. 19) contained in the servlet tag to the display area contents creator 123 (message 5601), and stands by until the result is received.

Then the display area contents creator 123 acquires a display area (messages 5602 and 5603), and acquires metadata of a template containing that display area from the resources DB 567 (messages 5604 and 5605). In the preferred embodiment of the invention, display areas are managed by a display area name 701, and the resources DB 567 and the arrangement rule DB 565 can be accessed with this display area name 701 as the key.

With these display area name 701 and page template ID 725 (acquired by message 5605) as the keys, the arrangement rule DB of this display area is accessed, and arranged objects are acquired (messages 5606 and 5607). Incidentally, while arranged objects are acquired with the display area name 701 and the page template ID 725 as the keys in the preferred embodiment of the invention, they can as well be accessed with only the display area name as the key by providing a display area name that can uniquely specify every page template.

In the example of FIG. 20, arranged objects 0001 and 0002 are acquired. Schedule information pieces 727 and 728 are taken out of these acquired arranged objects (messages 5608 and 5609), and a schedule engine 571 is inquired of about their validity (messages 5610 and 5611). It is further checked whether or not their parts are published (messages 5612 and 5613). In the example of FIG. 20, both the arranged objects 0001 and 0002 are published. Incidentally, supposing that the current date and hour are 19:00 on Jul. 26, 1999, in the example of FIG. 20, the arranged object 0001 does not meet the schedule condition while the arranged object 0002 does meet the schedule condition.

If it is judged that the scheduled is a valid one and a published part, a component DB 575 is accessed, and such items of information matching that part as the display image file, URL of link destination and explanatory statement are acquired (messages 5714 and 5715).

Figure 21:
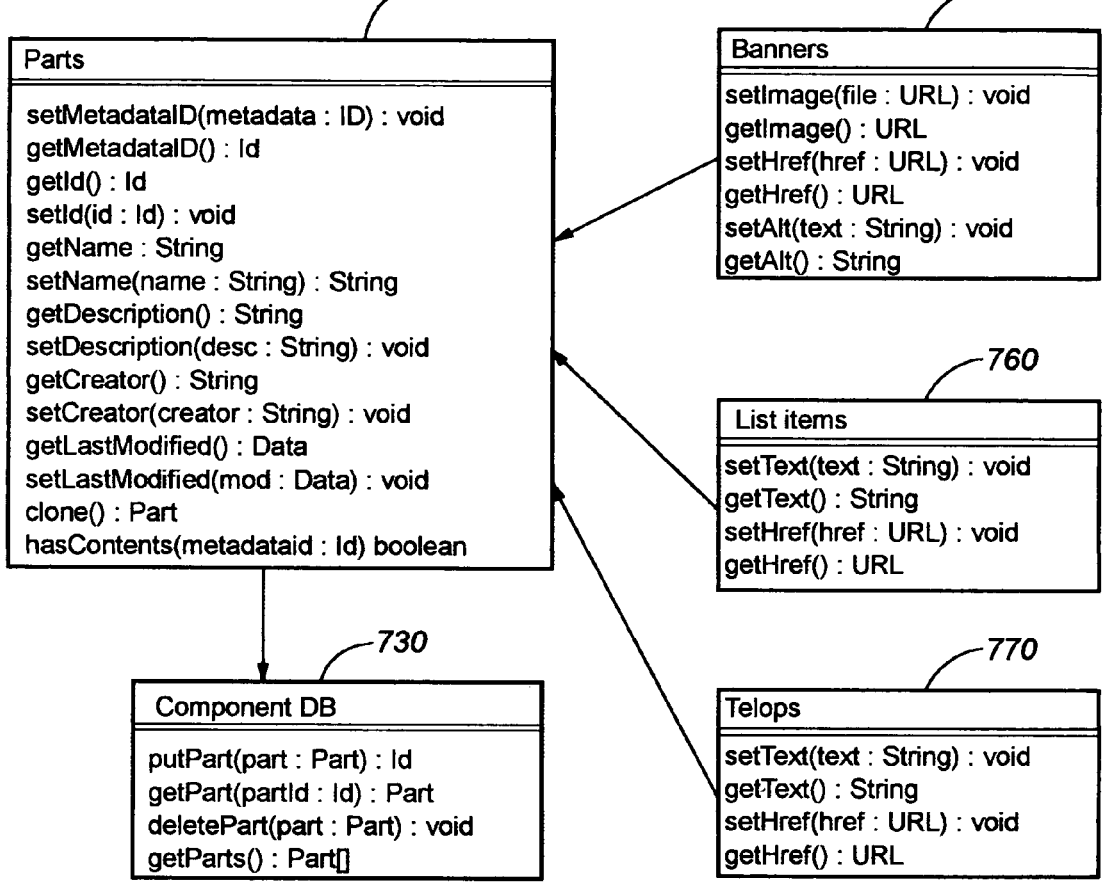
FIG. 21 is a conceptual diagram of a component DB in the preferred embodiment of the invention.

FIG. 21 is a conceptual diagram of the component DB in the preferred embodiment of the invention. In the preferred embodiment of the invention, a banner 750, list item 760, Telop 770 and so forth are registered as objects, instead of a simple table, to match a plurality of types of objects. Contents information items such as items of information to specify the display image of a banner (the bus name, directory name and file name) are set as properties of a banner object 750. The system can acquire contents information and make available to itself image information and the like by making an inquiry with the part name or the part ID as the key.

Referring back to FIG. 17, a display area contents creator 563 acquires display attributes 703 (FIG. 19) (message 5616) and, using a formatter 577, shapes the contents to adapt them to the display area (messages 5617 to 5631).

Figure 22:
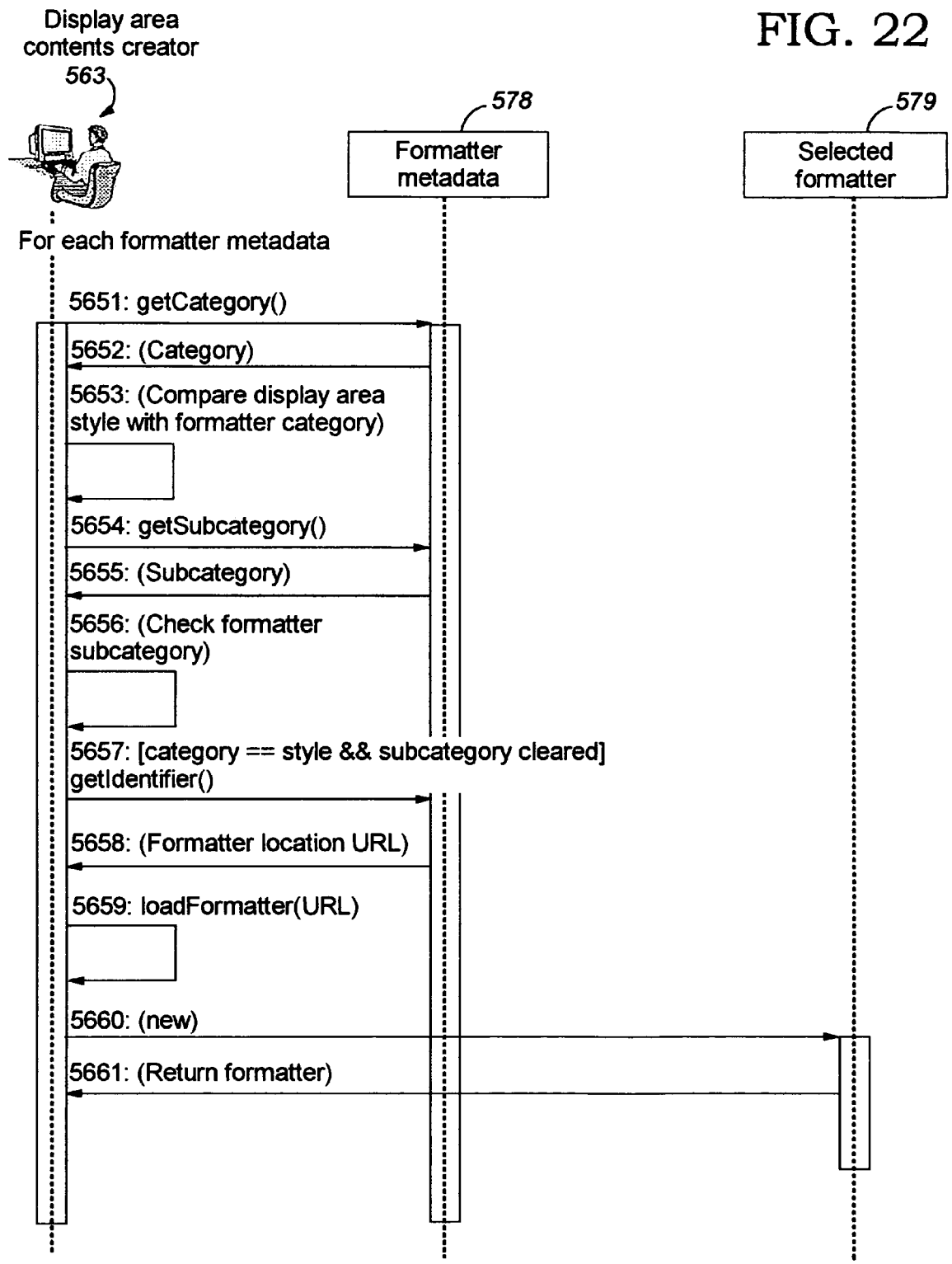
FIG. 22 shows message flows in a procedure of shaping contents by a formatter in the preferred embodiment of the invention.

FIG. 22 shows message flows in the procedure of shaping the contents by the formatter in the preferred embodiment of the invention. As shown in FIG. 22, the display area contents creator 563 takes out of formatter metadata 578 a format style registered as a category, compares it with the style of the display area, and judges whether or not those contents can be displayed (messages 5651 to 5653). It further takes out the type of output registered as a subcategory of metadata, and checks if the output form is HTML (messages 5654 to 5656).

While the formatter to be used is thus specified according to the type of part or output means such as the banner (standard), (a plurality of) banners, Telop and list item in the preferred embodiment of the invention, it is also acceptable to adopt a method by which the formatter is specified by using an ID which uniquely identifies a specific formatter or a method to specify a formatter by calculating a prescribed assessment value.

Then, information indicating the location of an actual format program (Identifier) is acquired from metadata 578 (messages 5657 and 5658), and a format program is loaded on the basis of that information (message 5659). This loaded format program is defined as the formatter to be used for this processing (messages 5660 and 5661).

Figure 23:
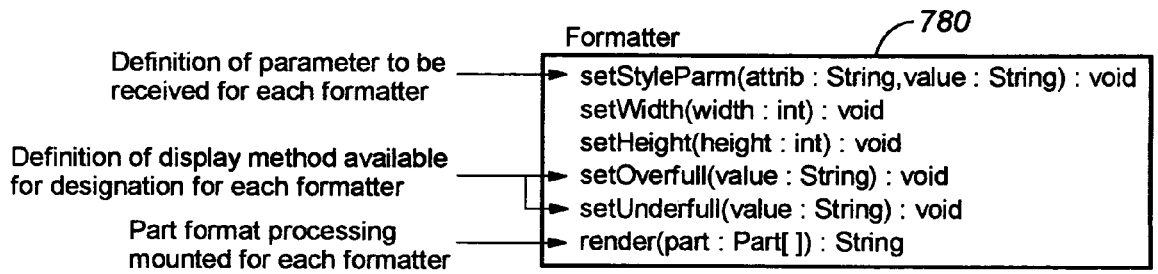
FIG. 23 is a conceptual diagram of a formatter in the preferred embodiment of the invention.

FIG. 23 is a conceptual diagram of a formatter 780 in the preferred embodiment of the invention. As illustrated, it has a parameter defining section (setStyleParm), width defining section (setWith), height defining section (setHight), overfull processing defining section (setoverfull), underfull processing defining section (setUnderfull) and format processing defining section (render).

The parameter defining section is a portion wherein a parameter received for each formatter is defined. The width defining section and the height defining section are portions where the size of a display area is acquired. The overfull processing defining section is a portion to acquire the type of processing to be performed when the size of any part to be displayed in a display area is greater than the display area, while the underfull processing defining section is a portion to acquire the type of processing to be performed when the size of any part to be displayed in a display area is smaller than the display area. The format processing definition section (render) is information to specify the location of the actual format program.

This formatter is such that, where for instance the definition in the display area is in a standard banner form (banner is set as the style) as shown in FIG. 24, the four banners to be displayed are replaced every two seconds in the display area as shown in FIG. 25 if, in an overfull case, the rotation is to take place at two second intervals (rotation=2 is set in partsOverful).

Further, as "shrink" is set in partsUnderful, when the size of any part to be displayed in a display area is smaller than the display area, the display area is displayed in a size shrunken to the size of the banner. Moreover, since an image is set on "default," the image defined here is displayed if there is no banner to be displayed.

Figure 26:
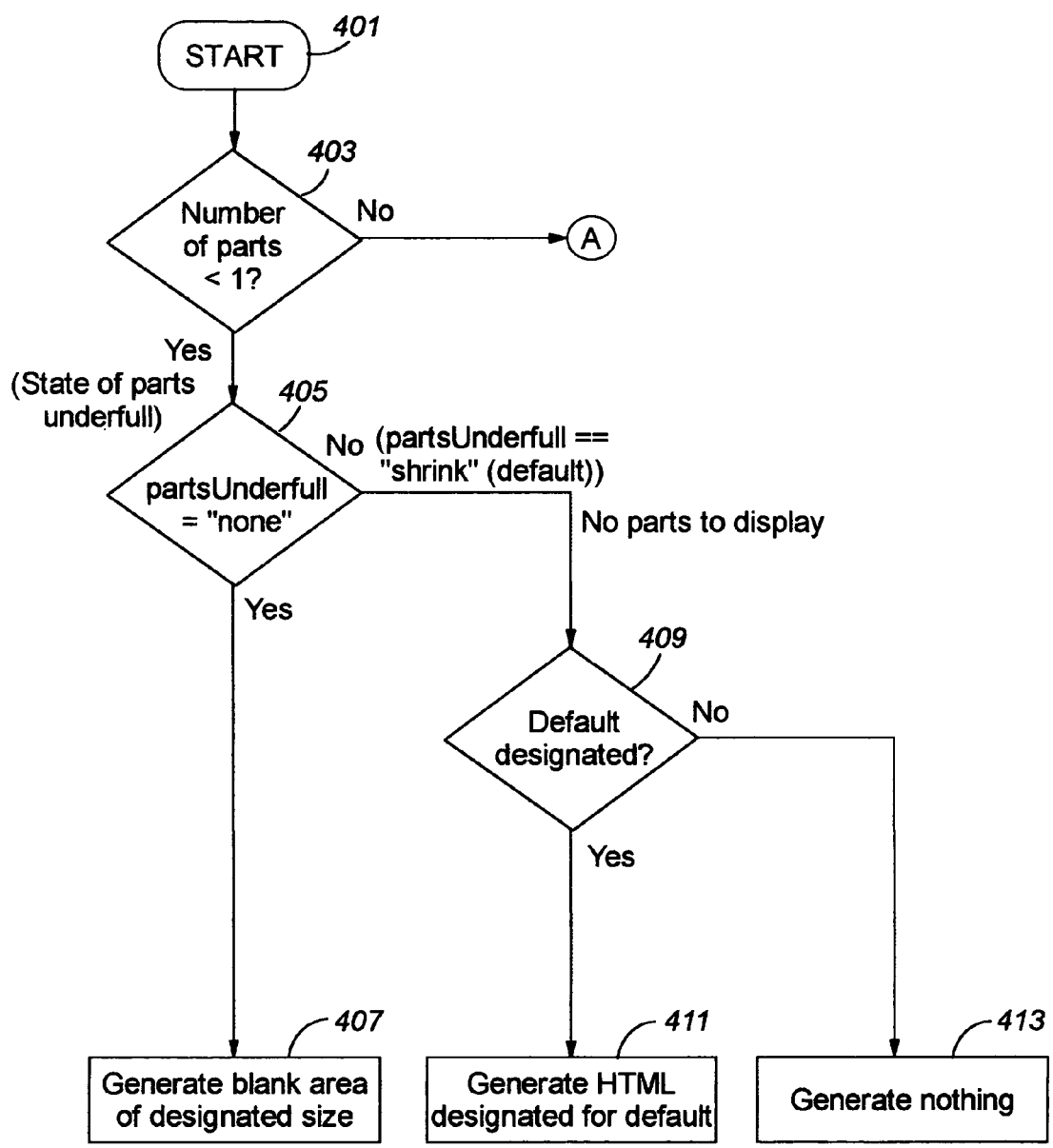
FIG. 26 is a flowchart of a formatter process where a standard banner form is designated in the preferred embodiment of the invention.
Figure 27:
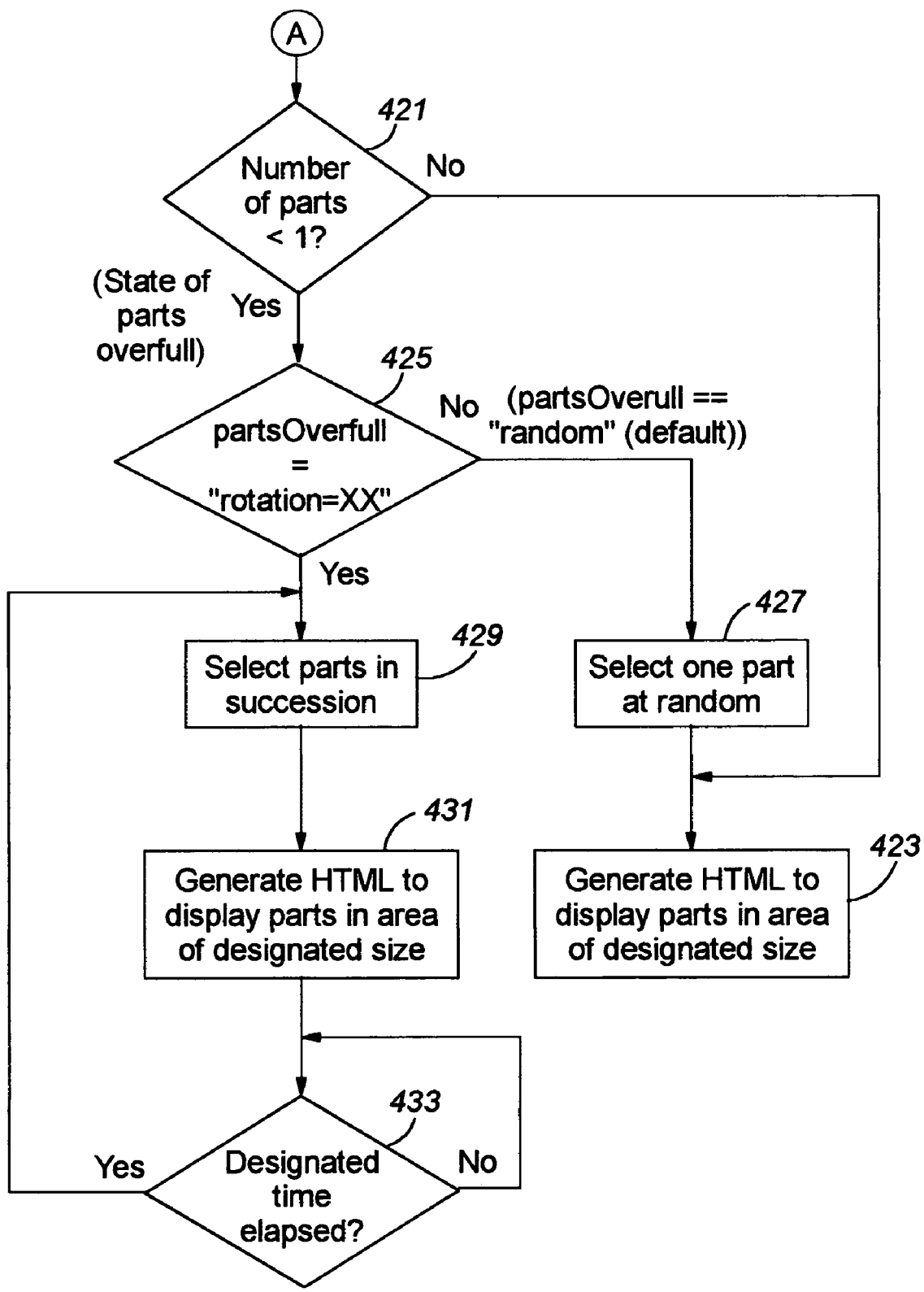
FIG. 27 is a flowchart of a formatter process where a standard banner form is designated in the preferred embodiment of the invention.

FIGS. 26 and 27 are flowcharts showing the formatter process where a standard banner form is designated in the preferred embodiment of the invention. First, the formatter acquires the number of parts (step 401), and checks that number of parts. In one aspect of the present invention, whereas the number of parts registered corresponding to a display area in the arrangement rule DB 720 and whose display conditions 727 to 729 have prescribed values matches the number of parts, in one aspect of the invention the contents to be displayed in a specific display area are stated in a bus name and the like in a fixed manner, and the number of such statements, or the number of contents as the result of acquisition thereby accomplished, corresponds to the number of parts.

In order to judge that the number of parts is smaller than one (the number of parts=0) (step 403), first the control command of partsUnderful is checked. If "none" is designated as the control command of partsUnderful (step 407), an HTML containing a blank area of a designated size is generated, and it is handed over to the display area contents creator 123 (step 407).

If "shrink" is designated as the control command of partsUnderful or there is no particular designation (in the preferred embodiment of the invention, partsUnderful=shrink is default), it is further judged whether or not a default display image is designated (step 409). If a default display image is designated, an HTML including bus information designated for default is generated, and handed over to the display contents creator 123 (step 411). If no default display image is designated, the absence of output information is notified back to the display contents creator 123 (step 413).

On the other hand, if the number of parts is judged to be 1 (step 421), an HTML to display the contents of the part in an area of a designated size is generated, and handed over to the display area contents creator 423 (step 423).

If the number of parts is judged to be more than one (step 421), it is further checked whether or not partsOverfull contains a command instructing rotation (step 425). If PartsOverfull contains designation of random, or if there is no particular designation (in the preferred embodiment of the invention, random is default), one part is selected out of a plurality of parts at random (step 427), an HTML to display the contents of parts within an area of a designated size is generated, and handed over to the display area contents creator 423 (step 423).

If it is judged that partsOverfull contains a command to instruct rotation, parts are selected in succession (step 429), an HTML to display the contents of the parts in an area of a designated size is generated, and handed over to the display area contents creator 423 (step 431). Then, after standing by for a prescribed length of time included in the rotation command, step 429 and step 431 are repeated (step 433). Incidentally, while a command to generate a time out is transmitted, in the preferred embodiment of the invention, from the web server 120 side between step 431 and step 433 to instruct the browser 111 to perform replotting, it is also acceptable to transmit a formatter logic to the browser 111 side as JavaScript or the like and to let a replotting event be generated on the browser 111 side.

On the other hand, in a form wherein a plurality of banners are displayed side by side (bannerFlow is set as the style) as shown in FIG. 28, if, in an overfull case, the rotation is to take place at two second intervals (random is set in partsOverful) the four banners to be displayed, as shown in FIG. 29, are placed in sequence from the top left of the display area and, when the width of the display area is overstepped, shift to a stage below to be displayed. Incidentally, in this example, the direction in which the banners are placed is horizontal and the background color is set to be gray. If the direction is set to be vertical, the banners can as well be placed in a vertical direction as illustrated in FIG. 30.

Figure 31:
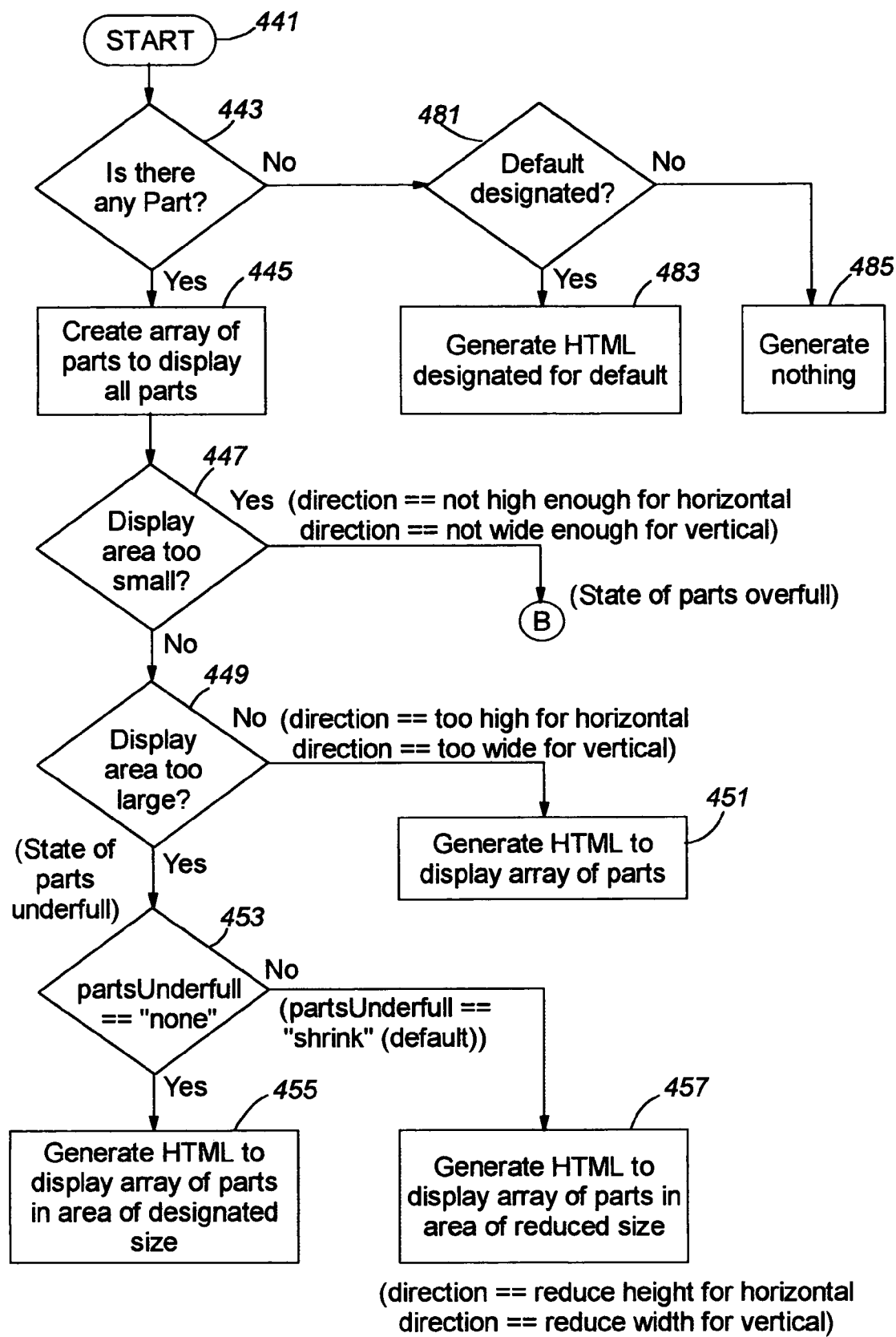
FIG. 31 is a flowchart of a formatter process where a banner flow form is designated in the preferred embodiment of the invention.
Figure 32:
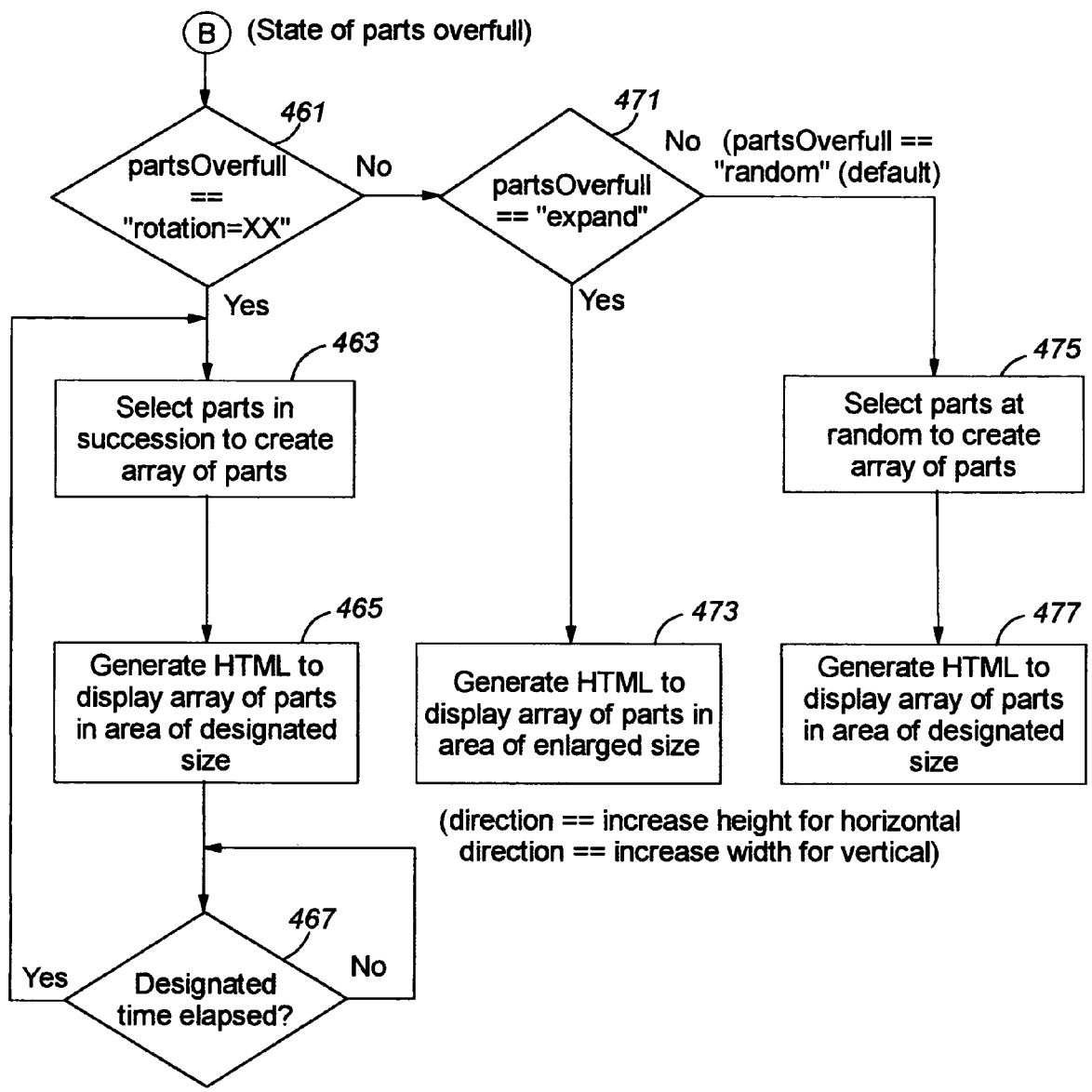
FIG. 32 is a flowchart of a formatter process where a banner flow form is designated in the preferred embodiment of the invention.

FIGS. 31 and 32 are flowcharts showing a formatter process in which a banner flow form is designated in the preferred embodiment of the invention. First the formatter acquires the number of parts (step 441), and checks that number of parts. If the number of parts is judged to be smaller than one (the number of parts=0) (step 443), it is further judged whether or not a default display image is designated (step 481). If a default display image is designated, an HTML including path information designated for default is generated, and handed over to the display contents creator 123 (step 483). If no default display image is designated, the absence of output information is notified back to the display contents creator 123 (step 485).

If there is any part to be displayed, an array of parts to display (the contents of) every part is created (step 445).

This array of parts constitutes data to designate which part is to be arranged on which line in which row. FIG. 33 is a conceptual diagram for describing the creation of an array of parts at step 445 in the preferred embodiment of the invention.

The formatter first confirms that the direction of arrangement is horizontal and that the width of the display area is not smaller than the width of the parts. Then it acquires parts in succession, and allocates those parts to a position (n, m) (both are 0 in initial value). It checks whether or not the total of the widths of the parts surpasses the width of the display area and, if it does not, allocates the parts to that position, and raises m to m+1. If the total of the widths of the parts surpasses the width of the display area, with n being raised to n+1 and m reduced to 0, those parts are allocated to that position, and m is raised to m+1. This procedure is repeated for all the parts, and the maximum values of n and m are acquired. The size of the array of parts will be the part width×m and the part height×n. Further, by comparing the part height×n with the display area height every time n is incremented by one, the appropriate number of parts to be accommodated by the display area can also be acquired. The array of parts in the vertical direction can be created in a similar procedure.

Then it judges whether or not the height of the display area is in sufficient (in the case of arranging in the horizontal direction) or the width of the display area is in sufficient (in the case of arranging in the vertical direction) as a result of (or in the process of) arraying the parts (step 447). If it is judged that the display area is not too small, it is further judged whether or not there is a surplus height of the display area (in the case of arranging in the horizontal direction) or there is a surplus width of the display area (in the case of arranging in the vertical direction) (step 449). If it is judged that the size of the array of parts is appropriate for the display area, an HTML to display that array of parts is generated, and handed over to the display contents creator 123 (step 451).

If it is judged that the display area is too large, the control command of partsUnderful is checked. If "none" is designated as the control command of partsUnderful (step 455), an HTML to display the array of parts in a display area of the designated size is generated, and handed over to the display area contents creator 123 (step 407). If "shrink" is designated as the control command of partsUnderful, or if there is no particular designation (in the preferred embodiment of the invention, partsUnderful shrink is default), an HTML to reduce the designated size of the display area and display the array of parts is generated, and handed over to the display area contents creator 123 (step 457).

On the other hand, if it is judged at step 447 that the display area is too small, the control command of partsoverful is checked. It is checked whether or not a command instructing rotation is contained as the control command of partsoverful (step 461).

If it is judged that partsOverfull contains a command instructing rotation, the parts are selected in succession to re-create an array of parts (step 463). FIG. 34 is a conceptual diagram for describing the creation of an array of parts at step 463 in the preferred embodiment of the invention. As illustrated, parts in the appropriate number of parts acquired at step 445 are selected in succession, and an array of parts is created by the method described with reference to FIG. 33. After the lapse of a designated length of time, parts in the appropriate number of parts are selected in succession from the next part onward to re-create an array of parts.

Then, an HTML to display the contents of the array of parts in a display area of the designated size is generated, and handed over to the display area contents creator 423 (step 465) and, after standing by for a prescribed length of time included in the rotation command, step 429 and step 431 are repeated (step 467).

If partsoverfull contains no designation of rotation at step 461, it is further checked whether or not the control command of partsOverful contains "expand" (step 471).

If "expand" is contained in partsoverfull, an HTML to expand the designated size of the display area and display the array of parts is generated, and handed over to the display area contents creator 123 (step 473), if "random" is designated by partsoverfull or if there is no particular designation (in the preferred embodiment of the invention, random is default), parts in a number to be appropriately arranged in the display area are selected out of a plurality of parts at random to create an array of parts (step 475).

FIG. 35 is a conceptual diagram for describing the creation of an array of parts at step 475 in the preferred embodiment of the invention. As illustrated, parts in the appropriate number of parts acquired at step 445 are selected at random, and an array of parts is created by the method described with reference to FIG. 33. Then, an HTML to display the contents of the array of parts in a display area of the designated size is generated, and handed over to the display area contents creator 423 (step 477).

D. Example of application to campaign using Internet

An aspect to alter the information to be displayed for a prescribed user in accordance with the circumstances of external resources and an aspect of notification in combination with e-mail will be described below.

Figure 36:
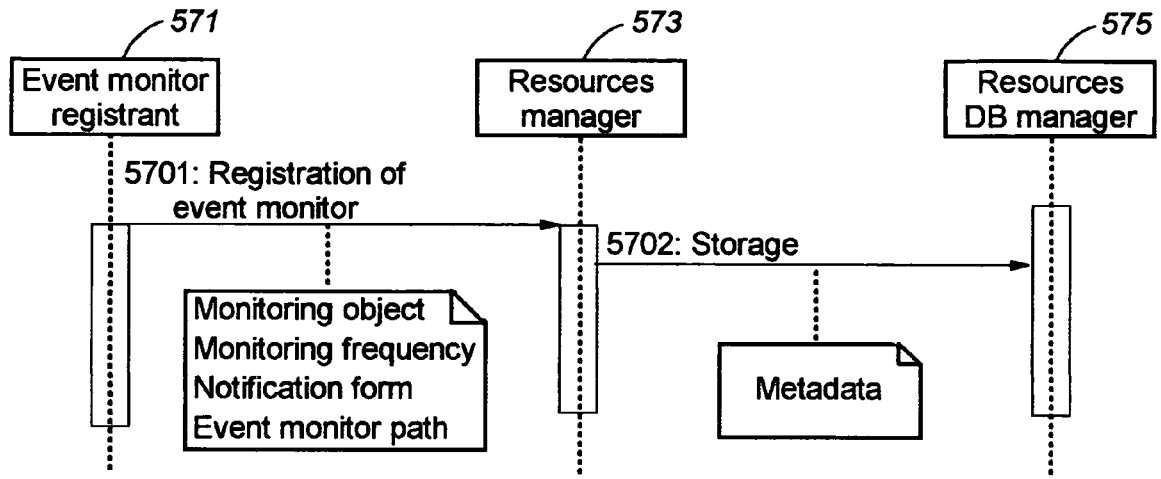
FIG. 36 shows message flows in an event monitor registration procedure in the preferred embodiment of the invention.

D-1. Registration of event monitor, condition determining cell parts and event cell parts FIG. 36 shows message flows in a procedure to register an event monitor in the preferred embodiment of the invention. As shown in FIG. 36, a registrant 571, using a resources manager 573 as in the case of FIG. 4, can register into a resources DB 575 event monitor parts in the JavaBean form (messages 5701 and 5702). In an event monitor JavaBean in the preferred embodiment of the invention, there are such items as monitoring object, monitoring frequency, notification form, and path information for event cell parts.

Also, in a procedure similar to the foregoing, condition determining cell parts and event cell parts are also registered. Condition determining cell parts include the conditions of an event target (for instance, out of user information to be contained in the user management DB, conditions for categorizing a user such as a prescribed age bracket, prescribed occupation, prescribed income level and a prescribed official position and their explanatory statements are contained as the items). Event cell parts are cell parts for registering persons for whom an event is to be actually held, and hold as their items information to specify condition determining cell parts (parts ID), filtering conditions and e-mail part ID. E-mail parts include such items as "from", "to", contents and explanatory statement.

D-2. Definition of campaign

Figure 37:
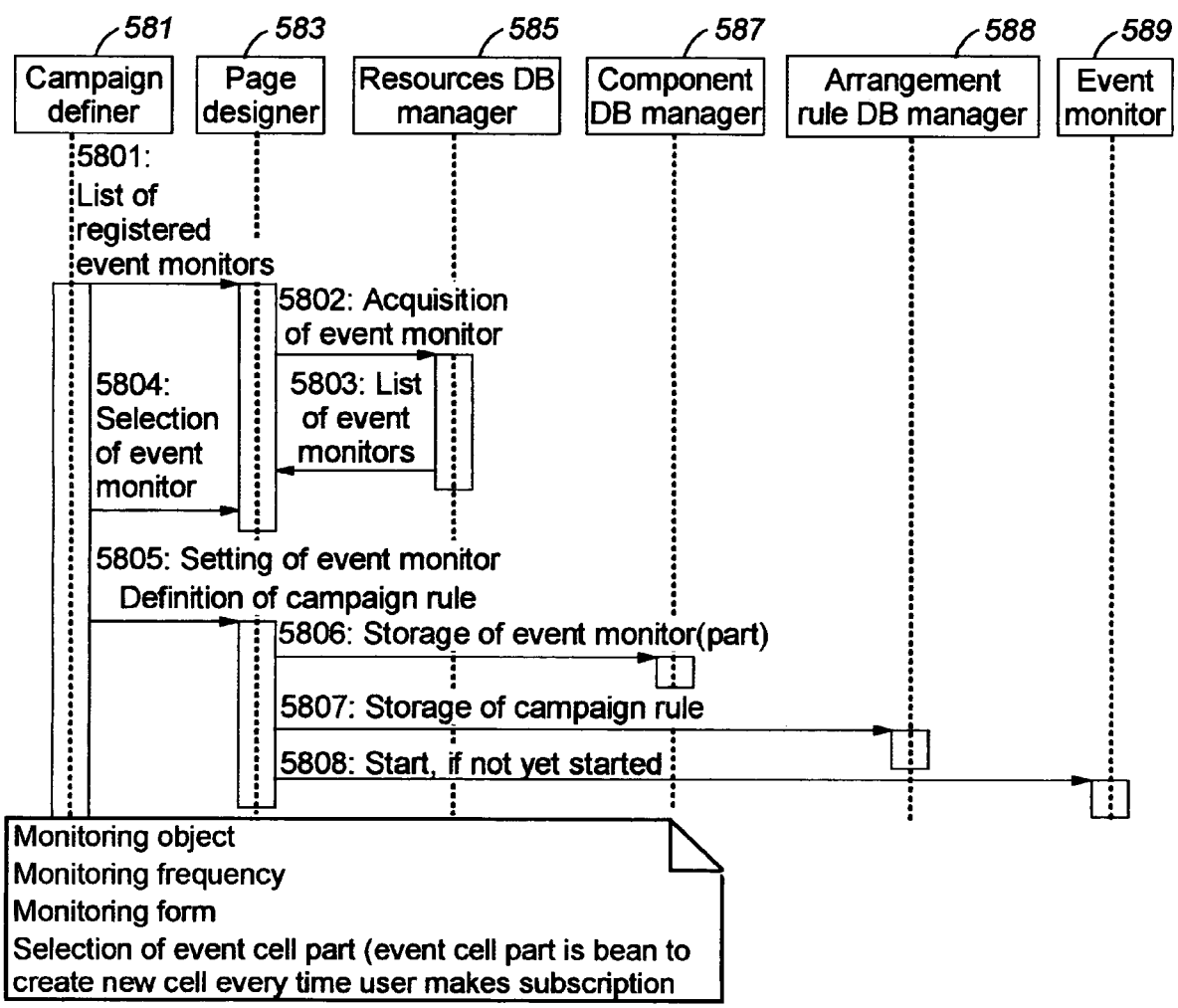
FIG. 37 shows message flows in a campaign definition procedure in the preferred embodiment of the invention.

FIG. 37 shows message flows in a campaign defining procedure in the preferred embodiment of the invention. As shown in FIG. 37, a campaign registrant 581, using a prescribed screen of a page designer 585 as in the case of FIG. 8 to FIG. 12, accesses the resources DB 575, and acquires a list of registered event monitors (messages 5801 to 5803).

A campaign definer 581 selects registration of a new event monitor (message 5804), and registers properties from the registration screen (message 5805). For instance, as monitoring objects, there are set an explanatory statement allowing intuitive perception of a monitoring object (such as the stock of an information company listed in the first section of the Tokyo Stock Exchange) and information which can identify the location where that information can be acquired (URL, information to specify a particular type of data in an HTML tag). As monitoring frequencies, such items as the default value, upper limit and lower limit are set. Notification forms which are set include the presence or absence of an e-mail notification. As path information for an event cell part, the path name, directory name and file name of the published event cell part are set. It is also practicable to set a part ID.

Then, as elements of campaign rules, schedule information and information on publication or non-publication are entered (message 5807). Incidentally, in this aspect of generating an event depending on the situation of other resources, it is desirable that an arrangement rule DB 720 manage such information as shown in FIG. 38. As this table shows, information including a part type 731, event flag 733, cell part ID 735 is added to the arrangement rule DE 720. The part type 731 is information to distinguish the type of the part, such as a banner part, Telop part, event cell part, condition determining cell part or event monitor part. Further, the event flag 733 is a flag to determine, where subscription to be described below takes place, whether an event is validated or not, and as the cell part ID 735 is set, in the case of an event monitor part, a condition determining cell part to be used by a user having performed subscription to be described below judges whether or not prescribed conditions are met, and in other cases, an event cell part registered for persons for whom the event is actually intended is registered.

Then, a page designer 583 designates an arrangement object for an event monitor 589 to instruct starting of the event monitor for the event (message 5808). This causes the event monitor 589 to start monitoring the event.

D-3. Subscription to event

FIG. 39 shows message flows in an event subscribing procedure in the preferred embodiment of the invention. As shown in FIG. 39, a user 591 desiring to subscribe to an event accesses a web page (message 5901). An execution run time (a component including the display area contents creator 123 and the schedule engine 125 in FIG. 2) accesses a user management DB 594, and acquires a user ID with Cookie contained in the HTTP request as the key (message 5902).

FIG. 40 is a conceptual diagram showing items of information managed by a user management DB 740 in the preferred embodiment of the invention. As shown in the table, the user management DB 740 manages a user ID 741, Cookie 743, e-mail address 745 and user profile information 747. The user profile information 747 includes information on that user including his or her age, occupation, place of work, home address and office address. In the preferred embodiment of the invention, a user registers these items of information on condition that he or she receive prescribed service on Internet. The user ID is automatically generated by the system. The system can acquire information contained in that record with the Cookie 743 and user ID as the keys.

If the execution run time 593 recognizes the uses as a registered member, it displays a list of published event monitor parts for the user (messages 5904 to 5906). Incidentally, if the execution run time 593 does not recognize the user as a registered member, a user registration panel can as well be outputted. Further, the preferred embodiment of the invention supposes subscription service for a membership, and it is also possible to provide subscription service for general public instead of a specific membership.

When the user has selected an event monitor, an event setting screen is displayed (messages 5907 and 5908). Then the user sets parameters for a condition formula and a notifying method (message 5909). For instance, the user can set such a condition that a notification by e-mail is desired when the stock price of Company A has risen above = Y120.00.

Then these set information and user management DB information are stored into a subscription DB 597 (messages 5910 to 5913). FIG. 41 is a conceptual diagram showing items managed by the subscription DB 597 in the preferred embodiment of the invention. As shown in the table, a subscription DB 750 manages a subscription ID 751, user ID 753, part ID 755, condition formula 757, notification form 758, and campaign flag 759. Then, if the event monitor designated by the user is not started, it is started (message 5914).

D-4. Monitoring and notification of event

Figure 42B:
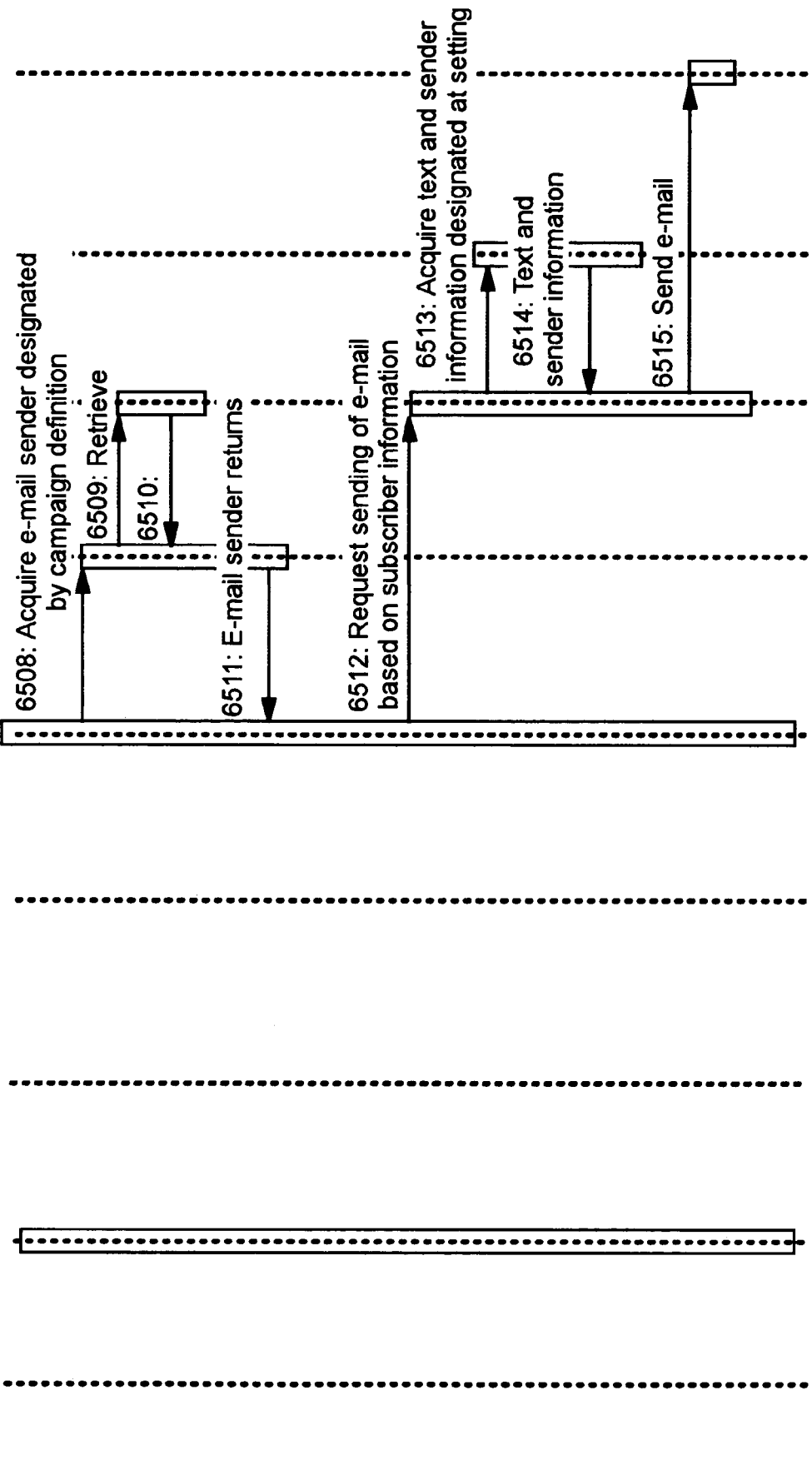
Figure 43:
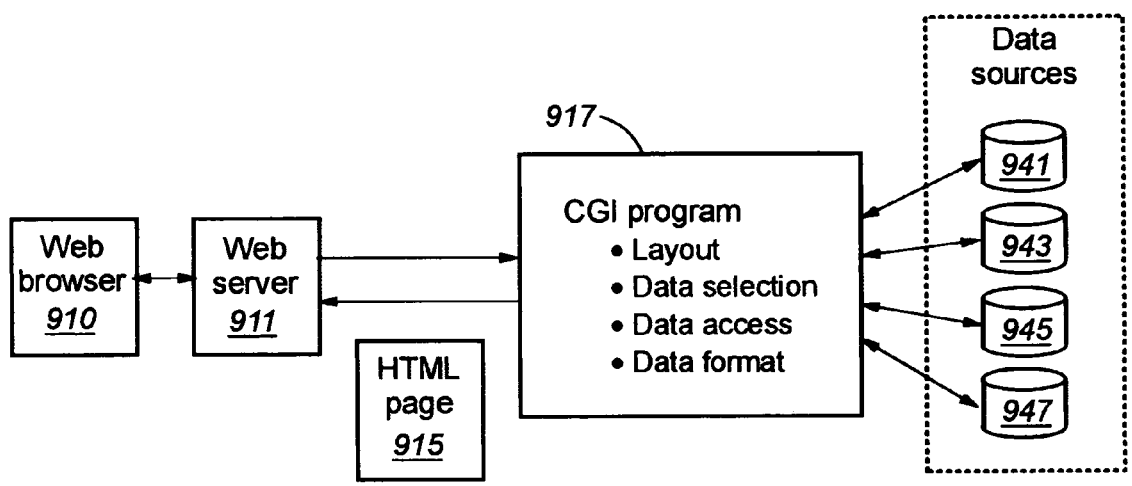
FIG. 43 is a prior art for embedding contents into a page template.
Figure 44:
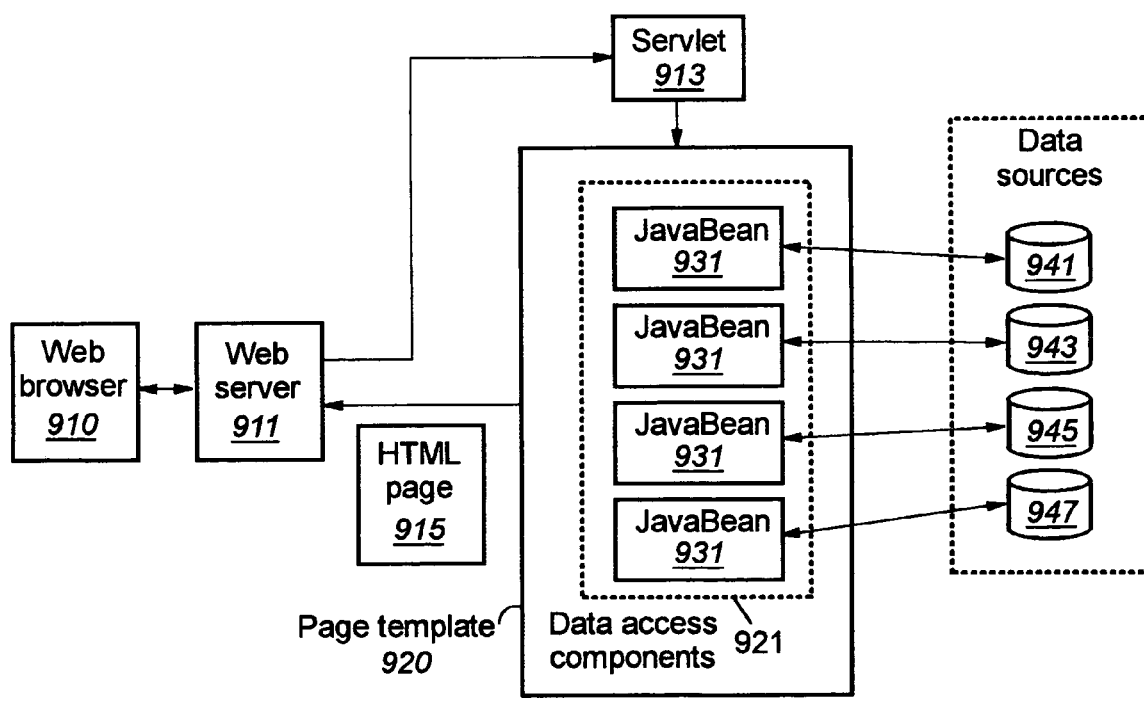
FIG. 44 is a prior art for embedding contents into a page template.

FIGS. 42A and 42B (Collectively FIG. 42) shows message flows in an event monitoring and notifying procedure in the preferred embodiment of the invention. As shown in FIG. 42, a started event monitor 653 monitors a monitoring object 651 containing data varying periodically or non-periodically in a period based on set monitoring frequency information (message 6501). In the preferred embodiment of the invention, the event monitor 653 has information items including a monitoring object, event generating condition, monitoring frequency, subscription ID and event flag, and monitors objects whose event flag is on. Incidentally, in the preferred embodiment of the invention, there further is a monitor part to monitor the event monitor, turning off the event flag 733 (FIG. 38) whose schedule has ended and notifying the event monitor 651 of that action.

Then, if the event monitor 651 finds that the event generating condition has been met, it accesses a subscription DB 655 and returns a user ID and part ID matching the subscription ID (messages 6502 and 6503). Then, the event monitor 653 accesses an arrangement rule DB 657 with the part ID as the key, and acquires a condition determining cell part ID 735 (FIG. 38). It further accesses the component DB, takes out a determining condition for condition determining cell parts, compares it with the user profile of the user management DB, and judges whether or not it is an object of the campaign (messages 6504 and 6505).

If the user is judged to be a target of the campaign, an event cell part matching the condition determining cell part is taken out, and the user ID or Cookie of that user is registered into that event cell part (message 6506). It is also possible to register only those users having designated a web in the notifying form.

Then, if the notification form 758 taken out of the subscription DB designates e-mail, the event monitor 653 hands over the ID of the e-mail part registered in the event cell part and the user ID to the execution run time 659 (message 6507).

The execution run time 659 accesses the e-mail part, acquires an e-mail sender (From) (messages 6508 to 6511), and requests an e-mail sender 663 to send the e-mail together with the user ID (message 6512).

The e-mail sender 663 accesses a user management DB 665, acquires an e-mail address from the user ID, generates an e-mail on the bases "from" and contents information held as a property by the e-mail part, and transmits the e-mail (message 6515).

And, if this user has transmitted an HTTP request asking for a prescribed page template, the processing described with reference to FIGS. 17 and 18 is executed. Then, an arrangement object used for this processing judges the event flag 733 and cell part ID 735 shown in FIG. 38, together with the schedules 727 and 728 and publish flag 729 as display conditions. In such a case, a cell part in which this user is registered is designated in the cell part ID 735 by message 6506 of FIG. 42, and the event flag is also set to be on, so that an HTML to display prescribed parts (banner) in the display area is acquired.

Thus, since shaping of a banner part has been taken up in describing the preferred embodiment of the invention, its formatter performs shaping (to fit the size of contents) of a display area, outputting of a default image, control of the background color, selection of the contents to be displayed, and control of the displaying sequence, display position, display time and display method of contents, but in the case of a formatter shaping a Telop part, it can also control the scrolling speed, font name, font size and character color.

As hitherto described, according to the present invention, it is possible to alter contents and their layout to be embedded into a page template without obliging the manager of display information to edit any HTML file or modify server programs such as CGI. It is also made possible to dynamically alter contents and their layout to be embedded into a page template according to the circumstances of accessing by a user. It is further made possible to provide information seeming to fit each user's preference only to that particular user or a group including that user and to enhance the effect of advertisement or the like.

What is claimed is:

1. A display information fixing method to be executed on a display information fixing apparatus for transmitting page information to an information terminal having a display screen and an input unit, comprising the steps of:
   (a) analyzing a page template specified by a display information acquisition request from said information terminal,
   (b) acquiring formatter specifying information and display attribute information from said page template,
   (c) acquiring a formatter on the basis of said formatter specifying information,
   (d) processing contents to be incorporated into said page template on the basis of said display attribute, to generate page information to be displayed on the display apparatus of said information terminal, wherein said page information is used to generate an HTML page; and
   (e) permitting alteration of said contents to be incorporated into said page template without requiring editing of an HTML file.

2. A display information fixing method to be executed on a display information fixing apparatus for transmitting display information to an information terminal having a display screen and an input unit, comprising the steps of:
   (a) analyzing a page template specified by a display information acquisition request from said information terminal,
   (b) Requiring formatter specifying information and display attribute information from said page template,
   (c) acquiring a formatter on the basis of said formatter specifying information,
   (d) acquiring information on a plurality of contents to be displayed on said page template,
   (e) generating, if it is judged that said display attributes include one indicating rotation, page information including information on a first content among said plurality of contents and for generating, after the lapse of a prescribed length of time, page information including information on a second content among said plurality of contents, wherein said page information is used to generate an HTML page; and
   (f) permitting alteration of said plurality of contents to be displayed on said page template without requiring editing of an HTML file.

3. A display information fixing method to be executed on a display information fixing apparatus for transmitting display information to an information terminal having a display screen and an input unit, comprising the steps of
   (a) analyzing a page template specified by a display information acquisition request from said information terminal,
   (b) acquiring formatter specifying information and display attribute information from said page template,
   (c) acquiring a formatter on the basis of said formatter specifying information,
   (d) acquiring information on a plurality of contents to be displayed on said page template,
   (e) excluding, if it is judged that said display attributes include one indicating random, information on a first content among said plurality of contents and for generating page information including information on a second content among said plurality of contents, wherein said page information is used to generate an HTML page; and
   (f) permitting alteration of said plurality of contents to be displayed on said page template without requiring editing of an HTML file.

4. A display information fixing method to be executed on a display information fixing apparatus for transmitting display information to an information terminal having a display screen and an input unit, comprising the steps of
   (a) analyzing a page template specified by a display information acquisition request from said information terminal,
   (b) acquiring formatter specifying information and display attribute information from said page template,
   (c) acquiring a formatter on the basis of said formatter specifying information,
   (d) acquiring information on any content to be displayed on said page template,
   (e) acquiring size information on a display area predefined to display the content from said page template,
   (f) comparing the size information on said display area and the size information on said acquired content,
   (g) adjusting, if it is judged that the size information on said display area has a greater value than the size information on said acquired content and said display attributes include one to instruct adjusted displaying, the size of said display area to the size of said content and generating page information, wherein said page information is used to generate an HTML page; and
   (h) permitting alteration of said content to be displayed on said page template without requiring editing of an HTML file.

5. A display information fixing method to be executed on a display information fixing apparatus for transmitting display information to an information terminal having a display screen and an input unit, comprising the steps of:
- (a) analyzing a page template specified by a display information acquisition request from said information terminal,
- (b) acquiring formatter specifying information and display attribute information from said page template,
- (c) acquiring a formatter on the basis of said formatter specifying information,
- (d) searching for information on a content to be displayed on said page template,
- (e) judging, if it is judged that there is no content to be displayed, whether or not information on default contents is defined in said page template,
- (f) generating, if any information on default contents exists, page information including said information on default contents, wherein said page information is used to generate an HTML page; and
- (g) permitting alteration of said content to be displayed on said page template without requiring editing of an HTML file.

6. A display information fixing method to be executed on a display information fixing apparatus for transmitting display information to an information terminal having a display screen and an input unit, comprising the steps of:
- (a) analyzing a page template specified by a display information acquisition request from said information terminal,
- (b) acquiring from said page template formatter specifying information and display attribute information on a formatter to control the arrangement of a plurality of contents,
- (c) acquiring a formatter on the basis of said formatter specifying information,
- (d) searching for information on a plurality of contents to be displayed on said page template,
- (e) generating page information on the arrangement of said contents on the basis of information indicating the direction of arrangement contained in said display attributes, wherein said page information is used to generate an HTML page; and
- (f) permitting alteration of said plurality of contents to be displayed on said page template without requiring editing of an HTML file.

7. A display information fixing means for transmitting page information to an information terminal having a display screen and an input unit, comprising:
- (a) means for analyzing a page template specified by a display information acquisition request from said information terminal,
- (b) means for acquiring from said page template formatter specifying information and display attribute information,
- (c) means for acquiring a formatter on the basis of said formatter specifying information,
- (d) means for processing, on the basis of said display attributes, contents to be incorporated into said page template and to generate page information to be displayed on the display unit of said information terminal, wherein said page information is used to generate an HTML page; and
- (e) means for permitting alteration of said contents to be incorporated into said page template without requiring editing of an HTML file.

8. A display information fixing means for transmitting page information to an information terminal having a display screen and an input unit, comprising:
- (a) means for analyzing a page template specified by a display information acquisition request from said information terminal,
- (b) means for acquiring formatter specifying information from said page template,
- (c) means for acquiring a formatter on the basis of said formatter specifying information,
- (d) means for transmitting a formatter, together with said page template, to said information terminal to process, on the basis of said display attributes, contents to be incorporated into said page template and for generating page information to be displayed on the display unit of said information terminal, wherein said page information is used to generate an HTML page; and
- (e) means for permitting alteration of said contents to be incorporated into said page template without inquiring editing of an HTML file.

9. A storage medium storing a display information fixing program to be executed on a display information fixing apparatus for transmitting page information to an information terminal having a display screen and an input unit, the program comprising:
- (a) a program code for instructing analysis of a page template specified by a display information acquisition request from said information terminal,
- (b) a program code for instructing acquisition of formatter specifying information and display attribute information front said page template,
- (c) a program code for instructing acquisition of a formatter on the basis or said formatter specifying information,
- (d) a program code for instructing processing of contents to be incorporated into said page template on the basis of said display attributes and generation of page information to be displayed on the display apparatus of said information terminal, wherein said page information is used to generate an HTML page; and
- (e) program code for permitting alteration of said contents to be incorporated into said page template without requiring editing of an HTML file.

10. A storage medium storing a display information fixing program to be executed on a display information fixing apparatus for transmitting display information to an information terminal having a display screen and an input unit, the program comprising:
- (a) a program code for instructing analysis of a page template specified by a display information acquisition request from said information terminal,
- (b) a program code for instructing acquisition of formatter specifying information and display attribute information from said page template,
- (c) a program code for instructing acquisition of a formatter on the basis of said formatter specifying information,
- (d) a program code for instructing acquisition of information on a plurality of contents to be displayed on said page template,
- (e) a program code for instructing, if it is judged that said display attributes include one indicating rotation, generating of page information including information on a first content among said plurality of contents and, after the lapse of a prescribed length of time, generation of page information including information on a second content among said plurality or contents, wherein said page information is used to generate an HTML page; and (f) program code permitting alteration of said plurality of contents to be incorporated into said page template without requiring editing of an HTML file.

11. A storage medium storing a display information fixing program to be executed on a display information fixing apparatus for transmitting display information to an information terminal having a display screen and an input unit, the program comprising:
(a) a program code for instructing analysis of a page template specified by a display information acquisition request from said information terminal,
(b) a program code for instructing acquisition of formatter specifying information and display attribute information from said page template,
(c) a program code for instructing acquisition of a formatter on the basis or said formatter specifying information,
(d) a program code for instructing acquisition of information on a plurality of contents to be displayed on said page template,
(e) a program code for instructing exclusion, if it is judged that said display attributes include one indicating random, of information on a first content among said plurality of contents and generation of page information including information on a second content among said plurality of contents, wherein said page information is used to generate an HTML page; and
(f) program code for permitting alteration of said plurality of contents to be displayed on said page template without requiring editing of an HTML file.

12. A storage medium storing a display information fixing program to be executed on a display information fixing apparatus for transmitting display information to an information terminal having a display screen and an input unit, the program comprising:
(a) a program code for instructing analysis of a page template specified by a display information acquisition request from said information terminal,
(b) a program code for instructing acquisition of formatter specifying information and display attribute information from said page template,
(c) a program code for instructing acquisition of a formatter on the basis of said formatter specifying information,
(d) a program code for instructing acquisition of information on any content to be displayed on said page template,
(e) a program code for instructing acquisition of size information on a display area predefined to display the content from said page template,
(f) a program code for instructing comparison of the size information on said display area with the size information on said acquired content,
(g) a program code for instructing, if it is judged that the size information on said display area has a greater value than the size information on said acquired content and said display attributes include one to instruct adjusted displaying, adjustment of the size of said display area to die sire of said content and for generating page information, wherein said page information is used to generate an HTML page; and (h) program code for permitting alteration of said content to be displayed on said page template without requiring editing of an HTML file.

13. A storage medium storing a display information fixing program to be executed on a display information fixing apparatus for transmitting display information to on information terminal having a display semen and an input unit, the program comprising:
(a) a program code for instructing analysis of a page template specified by a display information acquisition request from said information terminal,
(b) a program code for instructing acquisition of formatter specifying information and display attribute information from said page template,
(c) a program code for instructing acquisition of a formatter on the basis of said formatter specifying information,
(d) a program code for instructing searching for information on a content to be displayed on said page template,
(e) a program code for instructing, if it is judged that there is no content to be displayed, judgment of whether or not information on default contents is defined in said page template,
(f) a program code for instructing, if any information on default contents exists, generation of page information including said information on default contents, wherein said page information is used to generate an HTML page; and
(g) program code for permitting alteration of said content to be displayed on said page template without requiring editing of an HTML file.

14. A storage medium storing a display information fixing program to be executed on a display information fixing apparatus for transmitting display information to an information terminal having a display screen and an input unit, the programs comprising:
(a) a program code for instructing analysis of a page template specified by a display information acquisition request from said information terminal,
(b) a program code for instructing acquisition of formatter specifying information and display attribute information on a formatter to control the arrangement of a plurality of contents from said page template,
(c) a program code for instructing acquisition of a formatter on the basis of said formatter specifying information,
(d) a program code for instructing searching for information on a plurality of contents to be displayed on said page template,
(e) a program code for instructing generation of page information on the arrangement of said contents on the basis of information indicating the direction of arrangement contained in said display attributes, wherein said page information is used to generate an HTML page; and
(f) program code for permitting alteration of said plurality of contents to be displayed on said page template without requiring editing of an HTML file.

* * * * *

UNITED STATES PATENT AND TRADEMARK OFFICE
CERTIFICATE OF CORRECTION

PATENT NO. : 6,980,205 B1
DATED : December 27, 2005
INVENTOR(S) : Koji Zettsu et al.

It is certified that error appears in the above-identified patent and that said Letters Patent is hereby corrected as shown below:

Column 23,
Line 66, replace "requiring" with -- acquiring --.

Column 26,
Line 29, replace "front" with -- from --.

Column 27,
Line 59, replace "die sire" with -- the size --.

Column 28,
Line 7, replace "semen" with -- screen --.

Signed and Sealed this

Seventh Day of March, 2006

JON W. DUDAS
*Director of the United States Patent and Trademark Office*